United States Patent
Amir et al.

(10) Patent No.: US 10,204,301 B2
(45) Date of Patent: Feb. 12, 2019

(54) IMPLEMENTING A NEURAL NETWORK ALGORITHM ON A NEUROSYNAPTIC SUBSTRATE BASED ON CRITERIA RELATED TO THE NEUROSYNAPTIC SUBSTRATE

(71) Applicant: International Business Machines Corporation, Armonk, NY (US)

(72) Inventors: Arnon Amir, Saratoga, CA (US); Rathinakumar Appuswamy, San Jose, CA (US); Pallab Datta, San Jose, CA (US); Myron D. Flickner, San Jose, CA (US); Paul A. Merolla, Palo Alto, CA (US); Dharmendra S. Modha, San Jose, CA (US); Benjamin G. Shaw, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 14/662,096

(22) Filed: Mar. 18, 2015

(65) Prior Publication Data
US 2016/0335535 A1 Nov. 17, 2016

(51) Int. Cl.
G06N 3/04 (2006.01)
G06N 3/063 (2006.01)

(52) U.S. Cl.
CPC ............... *G06N 3/063* (2013.01); *G06N 3/04* (2013.01)

(58) Field of Classification Search
None
See application file for complete search history.

(56) References Cited

U.S. PATENT DOCUMENTS 6,269,353 B1  7/2001  Sethi et al.
6,463,438 B1  10/2002  Veltri
(Continued)

FOREIGN PATENT DOCUMENTS

CN  104685516 A  8/2013
WO  2013043610 A1  3/2013

OTHER PUBLICATIONS

Arthur, John V., et al. "Building block of a programmable neuromorphic substrate: A digital neurosynaptic core." Neural Networks (IJCNN), The 2012 International Joint Conference on. IEEE, 2012.*
(Continued)

*Primary Examiner* — Kakali Chaki
*Assistant Examiner* — Daniel T Pellett
(74) *Attorney, Agent, or Firm* — Sherman IP LLP; Kenneth L. Sherman; Hemavathy Perumal

(57) ABSTRACT

One embodiment of the invention provides a system for mapping a neural network onto a neurosynaptic substrate. The system comprises a reordering unit for reordering at least one dimension of an adjacency matrix representation of the neural network. The system further comprises a mapping unit for selecting a mapping method suitable for mapping at least one portion of the matrix representation onto the substrate, and mapping the at least one portion of the matrix representation onto the substrate utilizing the mapping method selected. The system further comprises a refinement unit for receiving user input regarding at least one criterion relating to accuracy or resource utilization of the substrate. The system further comprises an evaluating unit for evaluating each mapped portion against each criterion. Each mapped portion that fails to satisfy a criterion may be remapped to allow trades offs between accuracy and resource utilization of the substrate.

20 Claims, 17 Drawing Sheets

(56) References Cited

U.S. PATENT DOCUMENTS

| | | |
|---|---|---|
| 6,622,135 B1 | 9/2003 | Imbert De Tremiolles et al. |
| 6,990,444 B2 | 1/2006 | Hind et al. |
| 7,016,887 B2 | 3/2006 | Stockfisch |
| 7,089,592 B2 | 8/2006 | Adjaoute |
| 7,814,038 B1 | 10/2010 | Repici |
| 7,904,398 B1 | 3/2011 | Repici |
| 7,953,221 B2 | 5/2011 | Feghali et al. |
| 8,332,340 B2 | 12/2012 | Snider |
| 8,429,107 B2 | 4/2013 | Denneau et al. |
| 8,515,885 B2 | 8/2013 | Modha |
| 8,683,216 B2 | 3/2014 | Harmonen |
| 8,712,941 B2 | 4/2014 | Izhikevich et al. |
| 8,812,414 B2 | 8/2014 | Arthur et al. |
| 8,868,477 B2 | 10/2014 | Esser et al. |
| 8,904,347 B2 | 12/2014 | Miloushev et al. |
| 8,909,576 B2 | 12/2014 | Akopyan et al. |
| 8,977,583 B2 | 3/2015 | Modha |
| 8,990,130 B2 | 3/2015 | Alvarez-Icaza Rivera |
| 8,996,430 B2 | 3/2015 | Modha |
| 9,020,867 B2 | 4/2015 | Esser |
| 9,152,486 B2 | 10/2015 | Bird |
| 9,164,737 B2 | 10/2015 | Nathan et al. |
| 9,165,242 B2 | 10/2015 | Park |
| 9,412,063 B2 | 8/2016 | Appuswamy et al. |
| 9,489,622 B2 | 11/2016 | Modha |
| 9,524,462 B2 | 12/2016 | Esser et al. |
| 9,563,841 B2 | 2/2017 | Alvarez-Icaza Rivera et al. |
| 9,639,802 B2 | 5/2017 | Modha |
| 9,665,822 B2 | 5/2017 | Esser et al. |
| 9,697,461 B2 | 7/2017 | Modha |
| 9,747,545 B2 | 8/2017 | Akopyan et al. |
| 9,798,972 B2 | 10/2017 | Appuswamy et al. |
| 9,818,058 B2 | 11/2017 | Arthur et al. |
| 9,852,006 B2 | 12/2017 | Akopyan et al. |
| 2009/0276191 A1 | 11/2009 | Bell, Jr. et al. |
| 2011/0004579 A1 | 1/2011 | Snider |
| 2011/0106741 A1 | 5/2011 | Denneau et al. |
| 2012/0016829 A1 | 1/2012 | Snider |
| 2012/0084241 A1 | 4/2012 | Friedman et al. |
| 2012/0308074 A1* | 12/2012 | He .................. G06T 1/0064 382/100 |
| 2013/0031040 A1 | 1/2013 | Modha |
| 2013/0073484 A1 | 3/2013 | Izhikevich et al. |
| 2013/0073496 A1 | 3/2013 | Szatmary et al. |
| 2013/0218821 A1 | 8/2013 | Szatmary et al. |
| 2013/0232430 A1 | 9/2013 | Reitan |
| 2014/0019392 A1 | 1/2014 | Buibas |
| 2014/0052679 A1 | 2/2014 | Sinyavskiy et al. |
| 2014/0180987 A1 | 6/2014 | Arthur et al. |
| 2014/0280075 A1 | 9/2014 | Huang et al. |

OTHER PUBLICATIONS

Brüderle, Daniel, et al. "A comprehensive workflow for general-purpose neural modeling with highly configurable neuromorphic hardware systems." Biological cybernetics 104.4-5 (2011): 263-296. APA.*

Sporns, Olaf, Giulio Tononi, and Gerald M. Edelman. "Theoretical neuroanatomy: relating anatomical and functional connectivity in graphs and cortical connection matrices." Cerebral cortex 10.2 (2000): 127-141.*

Siirtola, Harri, and Erkki Mäkinen. "Constructing and reconstructing the reorderable matrix." Information Visualization 4.1 (2005): 32-48.*

Gemulla, Rainer, et al. "Large-scale matrix factorization with distributed stochastic gradient descent." Proceedings of the 17th ACM SIGKDD international conference on Knowledge discovery and data mining. ACM, 2011.*

Amir, Arnon, et al. "Cognitive computing programming paradigm: a corelet language for composing networks of neurosynaptic cores." Neural Networks (IJCNN), The 2013 International Joint Conference on. IEEE, 2013.*

Sporns, O. et al. "Organization, Development and Function of Complex Brain Networks", TRENDS in Cognitive Sciences, Sep. 2004, pp. 418-425, vol. 8, No. 9, Elsevier, United States.

Rempis, C. W. et al., "Search Space Restriction of Neuro-evolution through Constrained Modularization of Neural Networks", Proceedings of the 6th International Workshop on Artificial Neural Networks and Intelligent Information Processing (ANNIIP), Jun. 2010. pp. 13-22, SciTePress, Madeira, Portugal.

Miller, B. et al., "Embedding-Based Placement of Processing Element Networks on FPGAs for Physical Model Simulation", Proceedings of the ACM/SIGDA International Symposium on Field programmable gate arrays (FPGA '13), Feb. 11-13, 2013, pp. 181-190, ACM, United States.

Wang, R. M. et al. "A Mixed-Signal Implementation of a Polychronous Spiking Neural Network with Delay Adaptation." Frontiers in Neuroscience, Mar. 18, 2014, pp. 1-16, vol. 8, Art. 51, PMC, United States.

Misra, J. et al., "Artificial Neural Networks in Hardware: A Survey of Two Decades of Progress", Neurocomputing, Dec. 2010, pp. 239-255, vol. 74, No. 1, Elsevier, United States.

Wang, F. et al., "A Hierarchical Neural Network Approach to the Development of a Library of Neural Models for Microwave Design", IEEE Transactions on Microwave Theory and Techniques, Dec. 1998, pp. 2391-2403, vol. 46, No. 12, IEEE Press, United States.

Hidaka, S. et al., "Towards a Compositional Approach to Model Transformation for Software Development", Proceedings of the 2009 ACM symposium on Applied Computing, Mar. 9-12, 2009, pp. 468-475, ACM, United States.

Biggerstaff, T.J. et al., "The Library Scaling Problem and the Limits of Concrete Component Reuse", Proceedings of the 3rd International Conference on Software Reuse, Nov. 1-4, 1994, pp. 102-109, IEEE, United States.

Shaw, B. et al., "Cognitive Computing Commercialization: Boundary Objects for Communication", Proceedings of the 3rd International Conference of Design Engineering and Management for Innovation, Sep. 4-6, 2013, pp. 1-10, IBM, United States.

Zoeter, O., "A new approximate inference method for spike and slab model: expectation propagation with a replication trick", Mar. 27, 2012, pp. 1-13, IP.com, United States.

Fox, G.C., et al., "Load Balancing by a Neural Network", Oct. 31, 1986, pp. 1-55, IP.com, United States.

Cassidy, A.S. et al., "Cognitive Computing Building Block: A Versatile and Efficient Digital Neuron Model for Neurosynaptic Cores", Proceedings in the International Joint Conference on Neural Networks (IJCNN), 2013, pp. 1-10, IEEE, United States.

Chakrabarti, D. et al., "Fully Automatic Cross-Associations", Proceedings of the 10th ACM SIGKDD International Conference on Knowledge discovery and data mining (KDD '04), Aug. 22, 2004, pp. 79-88, ACM, United States.

Wendt, K. et al., GMPath—A Path Language for Navigation, Information Query and Modification of Data Graphs, Proceedings of the 2010 6th International Workshop Artificial Neural Networks and Intelligent Information Processing (ANNIP 2010), 2010, pp. 33-42, United States.

Ehrlich, M. et al., "A software framework for mapping neural networks to a wafer-scale neuromorphic hardware system", Proceedings of the 2010 Artificial Neural Networks and Intelligent Information Processing Conference, 2010, 1-10, United States.

Rodriguez, A., et al., "Migrating Subarea Networks to an IP Infrastructure Using Enterprise Extender", IBM.com/Redbooks, Aug. 2000, pp. 1-276, IBM, United States.

Corneil, D. et al., "Real-time inference in a VLSI spiking neural network", Proceedings of the 2012 International Symposium on Circuits and Systems (ISCAS), May 20-23, 2012, pp. 2425-2428, IEEE, United States.

Brette, R. et al., "Simulation of networks of spiking neurons. A review of tools and strategies", J. of Computational Neuroscience, Apr. 12, 2007, pp. 1-50, Springer Science, United States.

Djurfeldt, M., "The Connection-set Algebra—A Novel Formalism for the Representation of Connectivity Structure in Neuronal Network Models", Neuroinformatics, Mar. 23, 2012, pp. 287-304, vol. 10, Issue 3, Springer, United States.

(56) References Cited

OTHER PUBLICATIONS

International Search Report and Written Opinion dated Apr. 29, 2016 for International Application No. PCT/EP2016/051334 from European Patent Office, pp. 1-12, Rijswijk, Netherlands.
Plesser, H.E. et al., "Efficient Parallel Simulation of Large-Scale Neuronal Networks on Clusters of Multiprocessor Computers", Proceedings in the 13th International Euro-Par Conference, Lecture Notes in Computer Science, Aug. 28, 2007, pp. 672-681, vol. 4641, France.
Djurfeldt, M., "Efficient generation of connectivity in neuronal networks from simulator-independent descriptions", Frontiers in Neuroinformatics, Apr. 22, 2014, pp. 1-12, vol. 8, Article 43, United States.
Minkovich,K. et al., "Programming Time-Multiplexed Reconfigurable Hardware Using a Scalable Neuromporhic Compiler", Proceedings of the IEEE Transaction on Neural Networks and Learning Systems, Jun. 212, pp. 889-900, vol. 23, No. 6, United States.
Galluppi, F. et al., "A Hierachical Configuration System for a Massively Parallel Hardware Platform", Proceedings of the 9th Conference on Computing Frontiers (CF'12), May 15, 2012, pp. 183-192, United States.
Wendt, K. et al., "A graph theoretical approach for a multistep mapping software for the FACETS project", Proceedings of the 2nd WSEAS International Conference on Computer Engineering and Applications (CEA'08), Jan. 25, 2008, pp. 189-194, Mexico.
Eichner, H. et al., "Neural simulations on multi-core architectures", Frontiers in Neuroinformatics, Jul. 9, 2009, pp. 1-15, vol. 3, Article 21, United States.
Hikada, S. et al., "Towards a Compositional Approach to Model Transformation for Software Development" Proceedings of the 2009 ACM Symposium on Applied Computing, Mar. 8 2009, pp. 468-475, ACM, United States.
Esser, S.K. et al., "Cognitive Computing Systems: Algorithms and Applications for Networks of Neurosynaptic Cores" Proceedings of the 2013 International Joint Conference on Neural Networks (IJCNN), Aug. 4, 2013, pp. 1-10, IEEE, United States.
Imam et al., "A Digital Neurosynaptic Core Using Event-Driven QDI Circuits", Proceedings of the 18th IEEE International Symposium on Asynchronous Circuits and Systems, May 1, 2012, pp. 1-8, IEEE, United States.
Amir, A., et al., "Cognitive Computing Programming Paradigm: A Corelet Language for Composing Networks of Neurosynaptic Cores," in International Joint Conference on Neural Networks (IJCNN), 2013, p. 1-10, IEEE, United States.
Arthur, J.V. et al., "Building Block of a Programmable Neuromorphic Substrate: A Digital Neurosynaptic Core", Proceedings of the 2012 World Congress on Computational Intelligence (WCCI), Jun. 10-15, 2012, IEEE, United States.
Booton, J., "After Watson, IBM Looks to Build 'Brain in a Box'", FOXBusiness, Aug. 22, 2013, pp. 1-2, United States.
Esser, S.K. et al., "Cognitive Computing Systems: Algorithms and Applications for Networks for Neurosynaptic Cores", 2013, pp. 1-10, IBM, United States.
Gleeson, P. et al., "NeuroML: A Language for Describing Data Driven Models of Neurons and Networks with a High Degree of Biological Detail", Jun. 17, 2010, PLOS Computational Biology, pp. 1-19, vol. 6, Issue 6, United States.
Green, T.R.G. et al., "Usability Analysis of Visual Programming Environments: a 'cognitive dimensions' framework," Journal of Visual Languages and Computing, Jun. 1996, pp. 131-174, v. 7, issue 2, Elsevier, United States.

IBM, "IBM creates new foundation to program SyNAPSE chips inspired by human brain", Phys. Org., Aug. 8, 2013, pp. 1-3, IBM, United States.
International Search Report and Written Opinion dated Oct. 8, 2014 for International Application No. PCT/EP2014/051215 from European Patent Office, pp. 1-15, Rijswijk, Netherlands.
Munipalli, S.K., "An FPGA Implementation of a High Performance AER Packet Network", Jan. 1, 2013, Scholar Dissertations and Theses, pp. 1-105, Portland State University, PDXScholar, United States.
Nengo, "Nengo Neural Simulator", http://www.nengo.ca/, downloaded Feb. 13, 2015, p. 1-2, United States.
NEUFLOW, "An embedded eye, in your hands", http.//www.neuflow.org/, Feb. 6, 2012, p. 1-3, downloaded Feb. 13, 2015, United States.
Preissl, R. et al., "Compass: A scalable simulator for an architecture for Cognitive Computing", Proceedings of the 2012 International Conference for High Performance Computing, Networking, Storage and Analysis (SC), Nov. 10-16, 2012, pp. 1-11, IEEE, United States.
List of IBM Patents or Patent Applications Treated as Related Form; U.S. Appl. No. 14/669,575, filed Mar. 26, 2015; U.S. Appl. No. 14/528,885, filed Oct. 30, 2014; U.S. Appl. No. 14/662,115, filed Mar. 18, 2015; U.S. Appl. No. 13/791,505, filed Mar. 8, 2013; U.S. Appl. No. 14/626,677, filed Feb. 19, 2015.
Extended European Search Report dated Feb. 8, 2017 for European Application No. 16152389.9 from European Patent Office, pp. 1-13, Munich, Germany.
Liiv, I., "Seriation and Matrix Reordering Methods: An Historical Overview", Statistical Analysis and Data Mining, Mar. 11, 2010, pp. 70-91, vol. 3, No. 2, Wiley InterScience, United States.
List of IBM Patents or Applications Treated as Related.
Kumazawa, I. et al., "A Learning Scheme for Bipartite Recurrent Networks and Its Performance", Proceedings in the 1993 First New Zealand International Two-Stream Conference on Artificial Neural Networks and Expert Systems, Nov. 24-26, 1993, pp. 34-37, IEEE, United States.
Zhang, C. et al., "A Saturation Binary Neural Network for Bipartite Subgraph Problem", Proceeding in the ICIC'11 Proceedings of the 7th International Conference on Intelligent Computing: Bio-Inspired Computing and Applications, 2012, pp. 64-70, vol. 6840, Springer, Berlin.
List of IBM Patents or Patent Applications Treated as Related Form.
Shukla, R. et al., "Evaluating hopfield-network-based linear solvers for hardware constrained neural substrates", Proceeding from the 2017 International Joint Conference on Neural Networkds (IJCNN), 2017, pp. 3938-3945, IEEE, United States.
Such, F.P. et al., "Robust Spatial Filtering With Graph Convolutional Neural Networks", IEEE Journal of Selected Topics in Signal Procesing, Sep. 2017, pp. 884-896, vol. 11, No. 6, IEEE, United States.
Diehl, P.U. et al., "Conversion of Artificial Recurrent Neural Networks to Spiking Neural Networks for Low-power Neuromorphic Hardware", Proceedings from the 2016 IEEE International Conference on Rebooting Computing (ICRC), 2016, pp. 1-8, IEEE, United States.
Wang, H. et al. "Locality-Preserved Maximum Information Projection", IEEE Transactions on Neural Networks, Apr. 2008, pp. 571-585, vol. 19, No. 4, IEEE, United States.
Chinese Office Action dated Mar. 13, 2018 for Chinese Application No. 201610024915.5 from China Patent Office, pp. 1-12, Beijing City, China.
Chinese Office Action dated Mar. 27, 2018 for Chinese Application No. 201610052235.4 from China Patent Office, pp. 1-13, Beijing City, China, English portions only.

\* cited by examiner

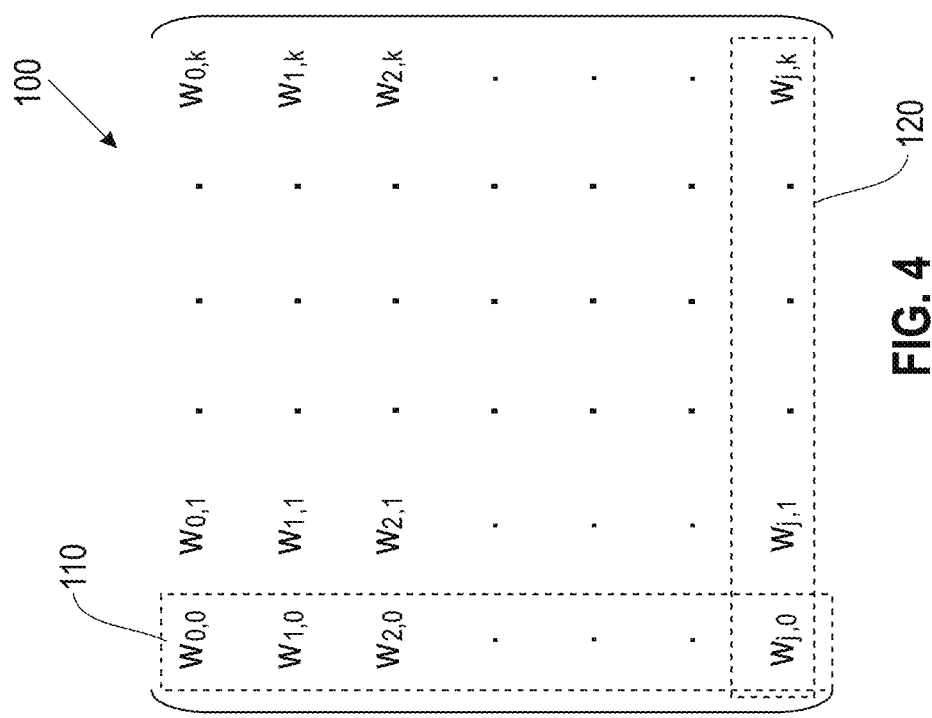
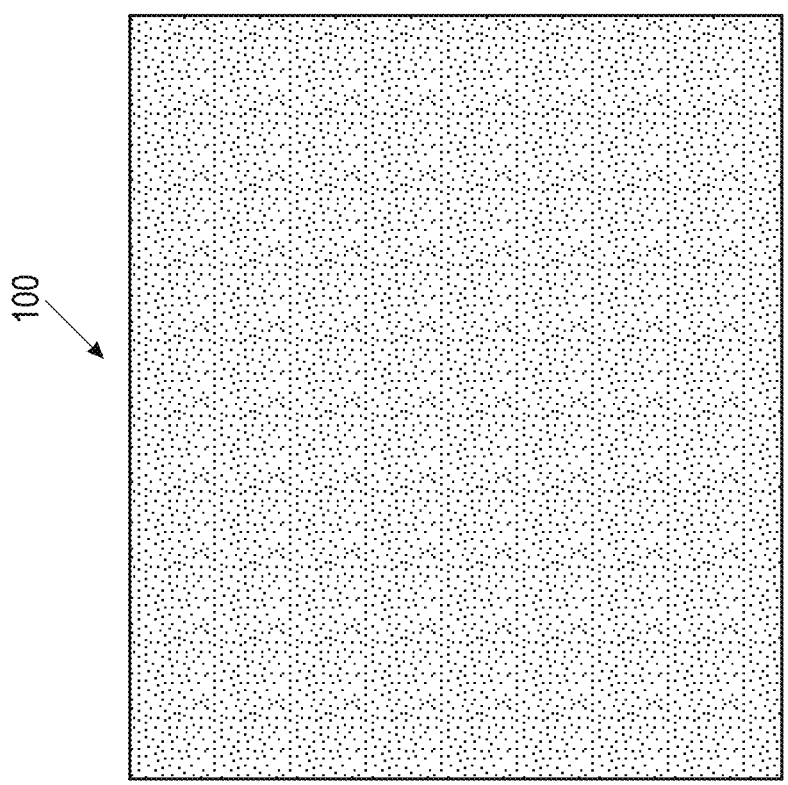

400

| ROW | BLOCK/ROW | BLOCK/ROW |
|---|---|---|
| 1 | A/1 | |
| 2 | B/1 | C/1 |
| 3 | ... | ... |
| 4 | | |

| COLUMN | BLOCK/ COLUMN | BLOCK/ COLUMN |
|---|---|---|
| 1 | C/4 | |
| 2 | B/3 | G/5 |
| 3 | D/3 | G/8 |
| 4 | ... | |

FIG. 17

IMPLEMENTING A NEURAL NETWORK ALGORITHM ON A NEUROSYNAPTIC SUBSTRATE BASED ON CRITERIA RELATED TO THE NEUROSYNAPTIC SUBSTRATE

This invention was made with Government support under HR0011-09-C-0002 awarded by Defense Advanced Research Projects Agency (DARPA). The Government has certain rights in this invention.

BACKGROUND

Embodiments of the invention relate to neuromorphic and neurosynaptic computation, and in particular, implementing a neural network algorithm on a neurosynaptic substrate based on criteria related to the neurosynaptic substrate.

Neuromorphic and neurosynaptic computation, also referred to as artificial neural networks, are computational systems that are inspired by biological brains. For example, neuromorphic and neurosynaptic computation may comprise various electronic circuits and/or create connections between processing elements that are inspired by neurons of a biological brain.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment of the invention provides a system for mapping a neural network onto a neurosynaptic substrate. The system comprises a reordering unit for reordering at least one dimension of an adjacency matrix representation of the neural network. The system further comprises a mapping unit for selecting a mapping method suitable for mapping at least one portion of the matrix representation onto the substrate, and mapping the at least one portion of the matrix representation onto the substrate utilizing the mapping method selected. The system further comprises a refinement unit for receiving user input regarding at least one criterion relating to accuracy or resource utilization of the substrate. The system further comprises an evaluating unit for evaluating each mapped portion against each criterion. Each mapped portion that fails to satisfy a criterion may be remapped to allow trades offs between accuracy and resource utilization of the substrate.

Another embodiment of the invention provides a method for mapping a neural network onto a neurosynaptic substrate. The method comprises reordering one or more dimensions of an adjacency matrix representation of the neural network. The method further comprises selecting, from a plurality of mapping methods, a mapping method suitable for mapping one or more portions of the matrix representation onto the neurosynaptic substrate, and mapping the one or more portions of the matrix representation onto the neurosynaptic substrate utilizing the mapping method selected. The method further comprises receiving user input regarding one or more criterions relating to at least one of accuracy and resource utilization of the neurosynaptic substrate, and evaluating each mapped portion against the one or more criterions. Each mapped portion that fails to satisfy the one or more criterions may be remapped to allow trades offs between accuracy and resource utilization of the neurosynaptic substrate.

These and other features, aspects and advantages of the present invention will become understood with reference to the following description, appended claims and accompanying figures.

BRIEF DESCRIPTION OF THE DRAWINGS

FIG. 3 illustrates an example adjacency matrix, in accordance with an embodiment of the invention;

FIG. 4 illustrates a detailed view of the example adjacency matrix in FIG. 3, in accordance with an embodiment of the invention;

FIG. 16 illustrates an example splitting table, in accordance with an embodiment of the invention;

FIG. 17 illustrates an example merging table, in accordance with an embodiment of the invention;

DETAILED DESCRIPTION

Figure 1:
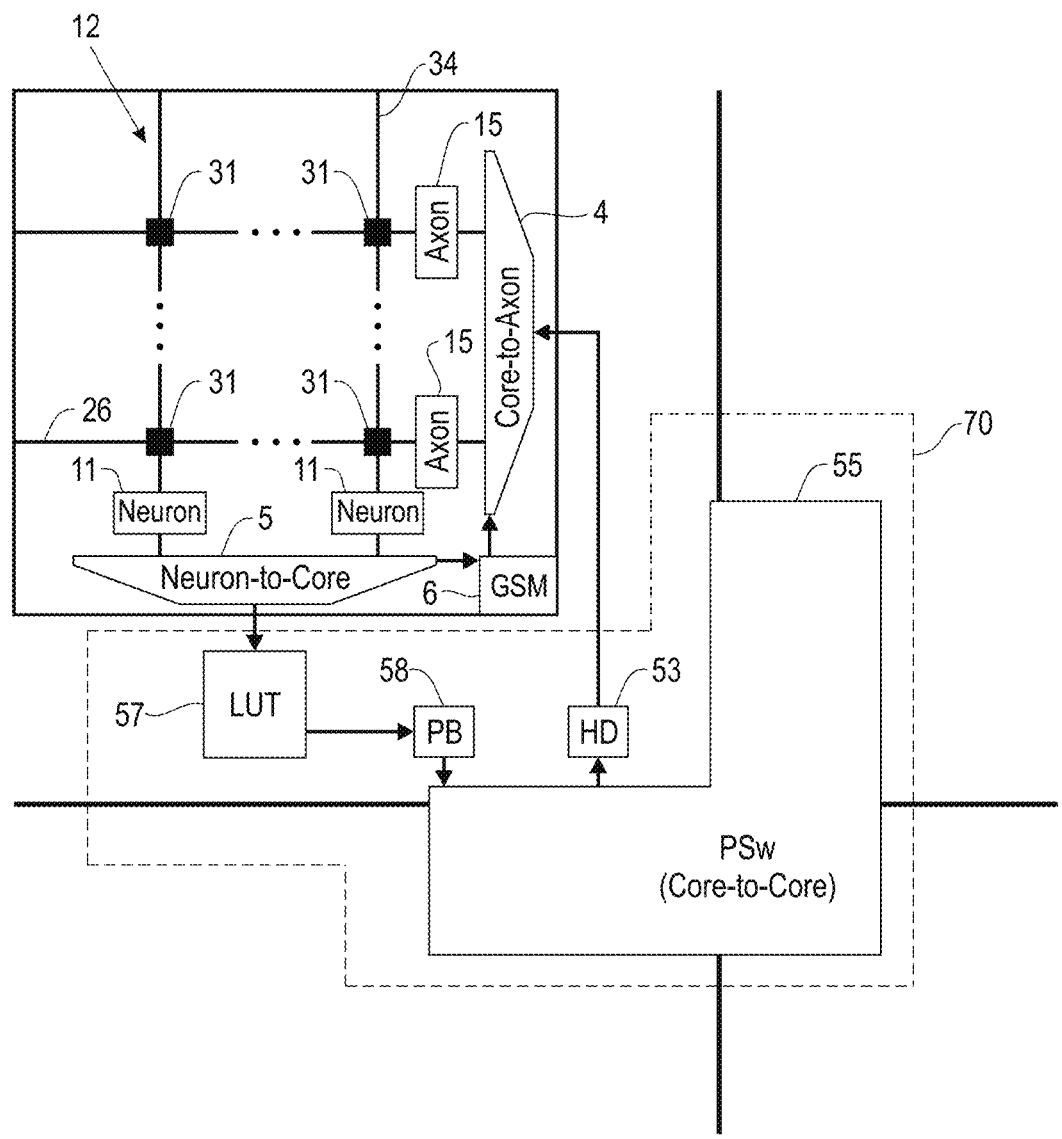
FIG. 1 illustrates an example neurosynaptic core circuit ("core circuit"), in accordance with an embodiment of the invention.

Embodiments of the invention relate to neuromorphic and neurosynaptic computation, and in particular, implementing a neural network algorithm on a neurosynaptic substrate based on criteria related to the neurosynaptic substrate. One embodiment of the invention provides a method for mapping a neural network onto a neurosynaptic substrate. The method comprises receiving a matrix representing synaptic connectivity information for a neural network, reordering at least one row and at least one column of the matrix, and mapping one or more portions of the matrix onto a neurosynaptic substrate based on one or more pre-determined conditions.

The term electronic neuron as used herein represents framework configured to simulate a biological neuron. An electronic neuron creates connections between processing elements that are roughly functionally equivalent to neurons of a biological brain. As such, a neuromorphic and neurosynaptic computation comprising electronic neurons according to embodiments of the invention may include various electronic circuits that are modeled on biological neurons. Further, a neuromorphic and neurosynaptic computation comprising electronic neurons according to embodiments of the invention may include various processing elements (including computer simulations) that are modeled on biological neurons. Although certain illustrative embodiments of the invention are described herein using electronic neurons comprising digital circuits, the present invention is not limited to electronic circuits. A neuromorphic and neurosynaptic computation according to embodiments of the invention can be implemented as a neuromorphic and neurosynaptic framework comprising circuitry, and additionally as a computer simulation. Indeed, embodiments of the invention can take the form of an entirely hardware embodiment, an entirely software embodiment or an embodiment containing both hardware and software elements.

The term neurosynaptic program as used herein represents a neurosynaptic network. A neurosynaptic program constitutes information relating to the following: neuronal properties and dynamics (e.g., a threshold parameter, a leak parameter, a delay parameter, a reset parameter, etc.) that determine an electronic neuron's response to input spikes, synaptic connections of the neuron (e.g., synaptic connections made via a synaptic crossbar), axon properties (e.g., axon types), and one or more destinations (e.g., target axons) to which the neuron's output spike should be delivered.

The term neurosynaptic network as used herein represents an instantiation of a neurosynaptic program. A neurosynaptic network may be instantiated in hardware, in simulation or both. For example, a neurosynaptic program may give rise to one or more instances of a neurosynaptic network, wherein the instances may reside on a single core, multiple cores, or multiple chips.

A spiking neural network may be used to solve computations more efficiently than conventional systems. A neural network algorithm represents a spiking neural network that may be expressed in the form of a graph including multiple nodes and multiple edges, wherein each node represents a neuron, and wherein each edge represents a synaptic connection. A wide variety of networks and algorithms can be expressed using graphs, including signal processing, classification, pattern recognition, object recognition, machine learning, Boolean and logical operations, temporal and associative memory, control systems, decision systems, prediction models, cognitive systems, etc. However, neurosynaptic computations differ from those typically performed by conventional (von Neumann) processors in that they are massively parallel, asynchronous (event-driven) and must be highly scalable to execute large graph models efficiently.

Neural network algorithms that take the form of graph models may be executed more efficiently on a neurosynaptic substrate. A substrate is a configuration of either hardware, software, firmware or any other means of computation, alone or in combination, which is optimized to implement, support or enable efficient execution of neural network algorithms. Efficiency is achieved by incorporating one or more constraints on the graph models that can be executed.

Embodiments of the invention take into account one or more constraints when implementing an arbitrary neural network algorithm on a given neurosynaptic substrate. For example, if a given neurosynaptic substrate comprises software elements, one or more software-related constraints of the substrate may be taken into account. These may include, by non-limiting example, system memory, the precision and type of numeric representation (e.g., number of bytes, 32 bit/64 bit, signed/unsigned, fixed/floating point), type of processor (e.g., CPU, CPU+GPU, CPU+FPGA), data structure or array sizes, messaging protocol in multi-processor environment (e.g., MPI), number of system threads, number of cards, number of lookup tables (Lust), etc. As another, non-limiting example, if a given neurosynaptic substrate comprises hardware elements, one or more hardware-related constraints of the substrate may be taken into account, such as constraints related to neuron characteristics (e.g., neuronal activity based on a linear threshold function, neuronal activity based on a sigmoid threshold function), synaptic weights (e.g., binary synaptic weights, integer synaptic weights, real-valued synaptic weights, number of synaptic weights, dynamic range of synaptic weights), and/or neuronal fan-in/fan-out (i.e., maximum number of neurons to which any given neuron can connect).

Conventional techniques for mapping a graph representing a neural network algorithm on a given neurosynaptic substrate are non-trivial, manual, tedious and error-prone, and do not guarantee a substrate-compliant implementation that satisfies constraints (e.g., software-related and/or hardware-related) of the substrate. Further, conventional techniques also do not allow for user interaction with the mapping in order to make tradeoffs. These issues present a major hurdle to the adoption of neurosynaptic substrates.

Embodiments of the invention provide a system and a method for mapping a neural network algorithm on a hardware neurosynaptic substrate that results in a substrate-compliant implementation satisfying one or more hardware-related constraints of the substrate. Embodiments of the invention further provide a guaranteed executable neural network algorithmic mapping that allows for user interaction (e.g., feedback, support and guidance) with the mapping in order to make trades offs between accuracy and substrate resource utilization.

In this specification, let G denote a graph representing a spiking neural network. The graph G may be represented in accordance with equation (1) provided below:

$$G=(V,f,E,w) \tag{1}$$

wherein V denotes a set of nodes representing neurons, wherein f denotes a mapping of the nodes to a set of neuron types, wherein E denotes a set of edges representing synaptic connections, and wherein w denotes a mapping from the set of edges E to real values. Synaptic weights and neuronal fan-out may be unconstrained.

FIG. 1 illustrates an example neurosynaptic core circuit ("core circuit") 10, in accordance with an embodiment of the invention. The core circuit 10 is an example hardware neurosynaptic substrate for fast, efficient, low-power implementation of neural network algorithms. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "x" represents multiplication, and m and n are positive integers.

Each synapse 31 communicates spike events (i.e., firing events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends spike events to the connected axon path 26. Each neuron 11 is connected to a dendrite path 34, and receives spike events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the spike events received, each neuron 11 generates a spike event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive spike events and generate a spike event according to the neuronal activation function. In one embodiment, the neurons 11 and axons 15 include comparator circuits that generate spike events according to the neuronal activation function. In one embodiment, the synapses 31 are implemented using 1-bit static random-access memory (SRAM) cells. Neurons 11 that generate a spike event are selected one at a time, and the spike events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives spike events and transmits them to target axons 15. The address-event transmitter 5 transmits spike events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises one or more packet routing systems 70. Each packet routing system 70 is configured to selectively route spike events among multiple core circuits 10. In one embodiment, each packet routing system 70 comprises an address lookup table (LUT) module 57, a packet builder (PB) module 58, a head delete (HD) module 53, and a core-to-core packet switch (PSw) 55. The LUT 57 is an N address routing table is configured to determine target axons 15 for spike events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts spike events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped spike event to the address-event receiver 4.

In one example implementation, the core circuit 10 may comprise 256 neurons 11. The crossbar 12 may be a 256× 256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation (AER)).

Although certain illustrative embodiments of the invention are described herein using synapses comprising electronic circuits, the present invention is not limited to electronic circuits.

Figure 2:
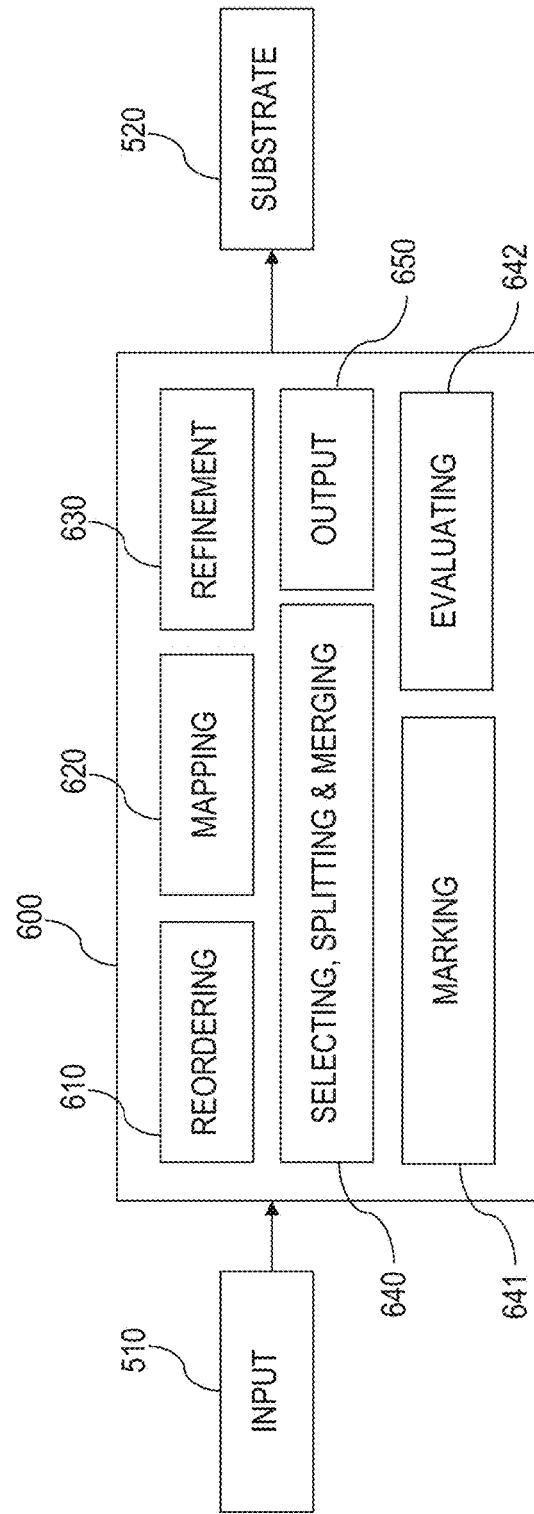
FIG. 2 illustrates an example framework, in accordance with an embodiment of the invention.

FIG. 2 illustrates an example framework 500, in accordance with an embodiment of the invention. The framework 500 comprises a system 600 for implementing a neural network algorithm, provided by an input unit 510 in the form of a graph G, on a neurosynaptic substrate 520. In one embodiment, the neurosynaptic substrate 520 may comprise only hardware elements. In another embodiment, the neurosynaptic substrate 520 may comprise only software elements. In yet another embodiment, the neurosynaptic substrate 520 may comprise both hardware and software elements.

In one example implementation where the neurosynaptic substrate 520 comprises hardware elements, the neurosynaptic substrate 520 may comprise the core circuit 10 in FIG. 1. In other example implementations where the neurosynaptic substrate 520 comprises hardware elements, the neurosynaptic substrate 520 may comprise one or more other neuromorphic core architectures neurosynaptic substrate 520 comprising hardware elements may have one or more hardware-related constraints on synaptic weights (e.g., in terms of their value, the number of different weights or dynamic range of weights), fan-in and fan-out (e.g., the maximum number of connections any neuron can have), neuron parameters and behaviors.

Figure 5:
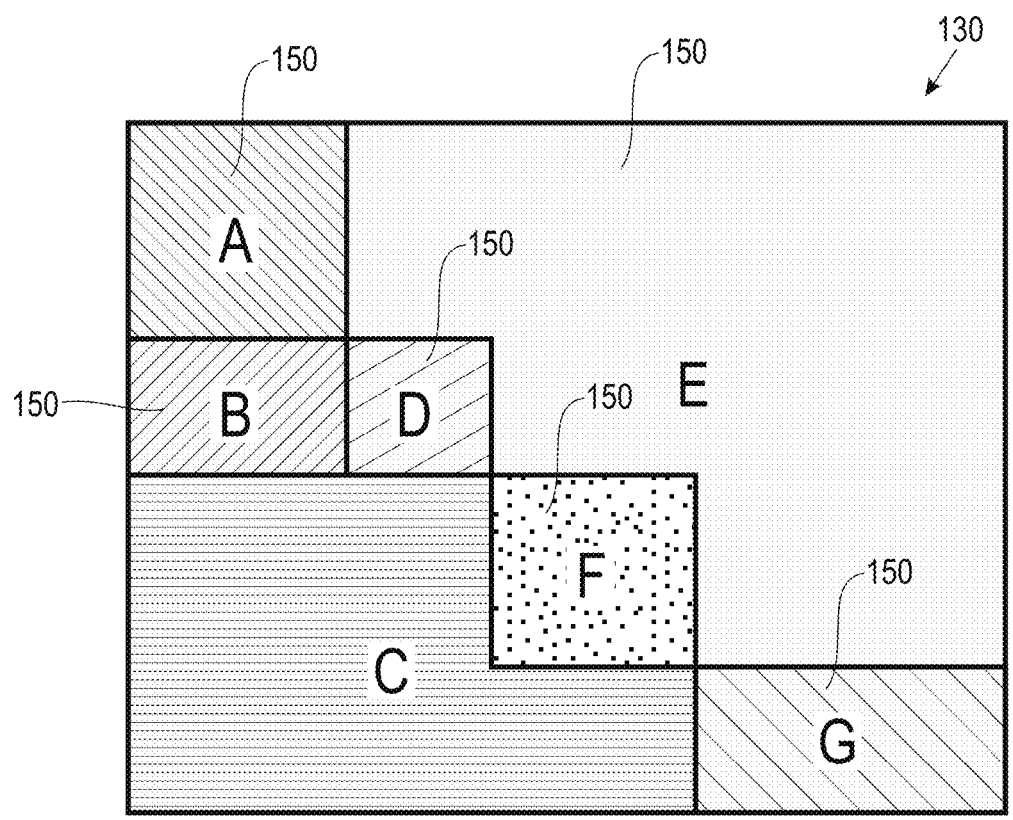
FIG. 5 illustrates an example reordered graph, in accordance with an embodiment of the invention.

In one embodiment, the system 600 comprises a reordering unit 610, a mapping unit 620, a refinement unit 630, a selecting, splitting and merging (SSM) unit 640, a marking unit 641, an evaluating unit 642, and an output unit 650. The graph G may be notionally represented as an adjacency matrix 100 (FIG. 4) comprising multiple rows 120 (FIG. 4) and multiple columns 110 (FIG. 4). The reordering unit 610 is configured for grouping the rows 120 and the columns 110 of the matrix 100 into multiple blocks 150 (FIG. 5), resulting in a reordered matrix 130 (FIG. 5). Each block 150 represents a sub-matrix of the reordered matrix 130. The mapping unit 620 is configured for mapping the blocks 150 onto the neurosynaptic substrate 520. The marking unit 641 marks each mapped block 150 as mapped.

Embodiments of the invention provide the ability to mix methods suitable for mapping any graph G representing a neural network algorithm onto a neurosynaptic substrate 520 in accordance with one or more user-defined evaluation metrics related to cost (e.g., in terms of power and neuromorphic resources) and/or accuracy. In one example implementation, the system 600 provides a set of methods M for mapping a graph G provided by the input unit 510 on a neurosynaptic substrate 520. Let m denote a method belonging to the set of methods M. Each method m is differentiated on the basis of a set of characteristics C. The set of characteristics C may include characteristics such as resultant weight accuracy, dynamic range (communication) accuracy, neurosynaptic resource utilization (e.g., neurons, axons, synapses), etc. The characteristics may be evaluated on the basis of specific properties of the graph G, such as sparseness/density, synaptic weights (e.g., real, integer, binary) and/or any other graph-theoretic measure.

For each block 150, the SSM unit 640 is configured for selecting and applying a method m best-suited for mapping the block 150 on the neurosynaptic substrate 520. The system 600 proceeds with the mapping in an iterative/recursive manner until all areas of the graph G have been mapped onto the neurosynaptic substrate 520.

The refinement unit 630 is configured for facilitating user interaction with the mapping. The evaluating unit 642 evaluates results on a block-by-block or overall basis with iteration to conform results to user-defined criteria/evaluation metrics (e.g., cost, accuracy) received via the refinement unit 630.

In one embodiment, the output unit 650 is configured for providing an output file (i.e., model file) representing a substrate-mapped neural network. The neurosynaptic substrate 520 may be programmed in accordance with the output file. The output unit 650 may further provide additional outputs, such as evaluation results for the mapped neural network against each metric (either overall or on a block-by-block basis), a matrix or permutation vectors relating the final location of rows and columns in the reordered matrix 100 to their original locations in the original matrix 100, and/or an accounting of delays introduced by the block formation and mapping methods.

FIG. 3 illustrates an example matrix representation 100 of a graph G representing a neural network algorithm, in accordance with an embodiment of the invention. FIG. 4 illustrates a detailed view of the example matrix representation 100 in FIG. 3, in accordance with an embodiment of the invention. As stated above, a graph G representing a neural network algorithm may be notionally represented as an adjacency matrix 100 comprising multiple rows 120 and multiple columns 110. The rows 120 and the columns 110 may be labeled in accordance to a set of nodes V for the graph G, wherein each node is mapped to a set of neuron types based on a mapping f.

In one embodiment, the rows 120 represent sources and the columns 110 represent targets. In one embodiment, an entry in the matrix 100 at a particular row i and a particular column j is related to a synaptic connection between a source represented by the row i and a target represented by the column j. In one example implementation, the entry is a binary value. In another example implementation, the entry is a synaptic weight $w_{i,j}$ corresponding to the synaptic connection.

The fan-in of the graph G is the maximum number of entries occurring in any column 110. The fan-out of the graph G is the maximum number of entries occurring in any row 120.

FIG. 5 illustrates an example reordered matrix 130, in accordance with an embodiment of the invention. The reordering unit 610 of the system 600 rearranges rows 120 and columns 110 of a matrix representation 100 of a neural network algorithm into a reordered matrix 130 with multiple blocks 150. For example, as shown in FIG. 5, the reordering unit 610 provides a reordered matrix 130 including multiple blocks 150, such as blocks A, B, C, D, E, F and G. The blocks 150 shown in FIG. 5 have different densities (grayscale shading is utilized in FIG. 5 to denote the average density of the blocks 150; blocks 150 with darker shading are denser than blocks 150 with lighter shading).

As described in detail later herein, the reordering unit 610 is configured to apply different reordering methods that may be particularly advantageous in conjunction with specific mapping methods. The reordering may be performed based on attributes that offer best discrimination amongst multiple mapping methods (e.g., clustering non-zero entries in a binary weight matrix, clustering similar values in a real-valued matrix).

Figure 6:
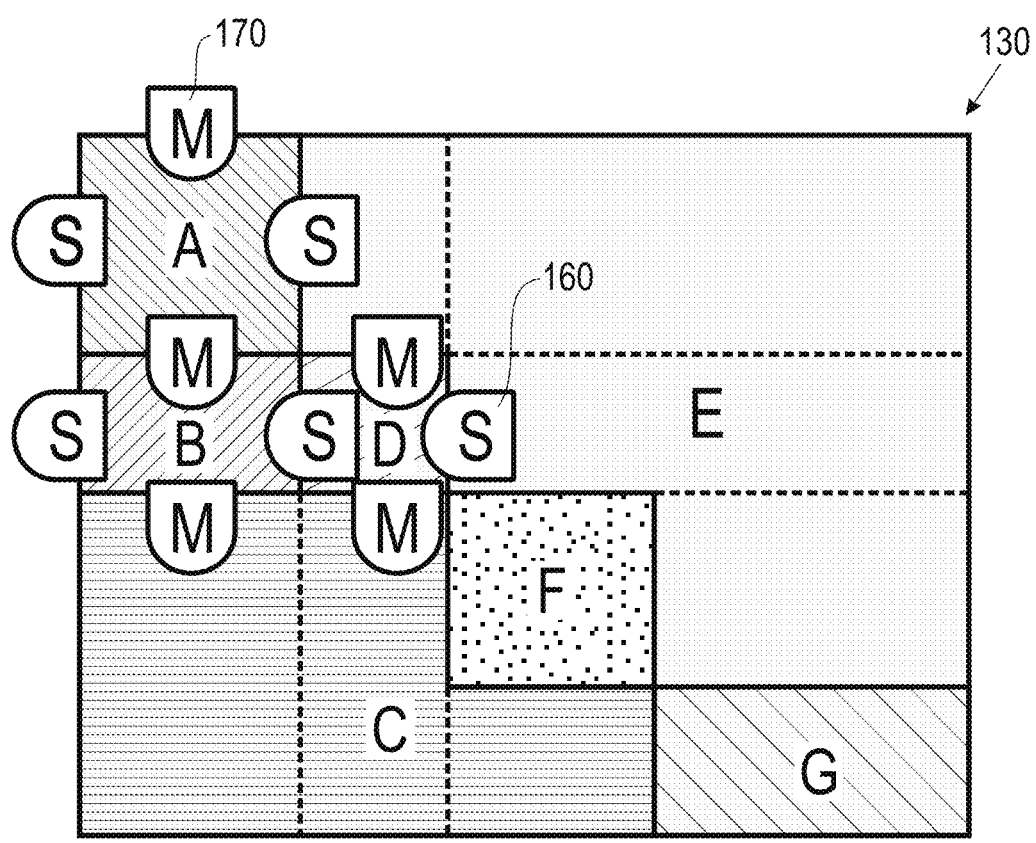
FIG. 6 illustrates an example reordered graph with splitters and mergers to allow extraction of sub-matrices as mappable blocks, in accordance with an embodiment of the invention.

FIG. 6 illustrates an example reordered graph 130 with splitters 160 and mergers 170 to allow extraction of sub-matrices as mappable blocks, in accordance with an embodiment of the invention. The term splitting as used herein denotes the addition of rows to an adjacency matrix representation of a graph G representing a neural network algorithm. In one example implementation, the addition of rows represents the addition of sources, such as neurons. The term merging as used herein denotes the addition of columns to the adjacency matrix representation of a graph G representing a neural network algorithm. In one example implementation, the addition of columns represents the addition of targets, such as axons. Splitting and merging allow effective disassociation of a block or sub-matrix within an adjacency matrix representation of a graph G to be mapped in the most effective manner. In one embodiment a splitter 160 is a neuron 11 configured for receiving input spikes on a common axon, duplicating the input spikes, and sending the duplicates to multiple targets. Splitters 160 may be used to increase effective fan-out. When a desired fan-out exceeds dimensionality of a given neurosynaptic substrate 520 (e.g., exceeds dimensionality of a crossbar 12 of a core circuit 10), the SSM unit 640 may implement multi-level splitting when mapping a neural network algorithm on the substrate 520 to satisfy the desired fan-out.

In another embodiment, a merger 170 is a neuron 11 configured for receiving input spikes on multiple axons, and applying a merging function (e.g., OR, AND, SUM) to the input spikes. Mergers 170 may be used to increase effective fan-in. When a desired fan-in exceeds dimensionality of a given neurosynaptic substrate 520 (e.g., exceeds dimensionality of a crossbar 12 of a core circuit 10), the SSM unit 640 may implement multi-level merging when mapping a neural network algorithm on the substrate 520 to satisfy the desired fan-in.

Splitters 160 are generally neuron-bounded, requiring a larger number of neurons than axons. By comparison, mergers 170 are axon-bounded, requiring more axons than neurons. Embodiments of the invention combine an appropriate number of splitters 160 and mergers 170 on a neurosynaptic substrate 520 when mapping a neural network algorithm on the substrate 520, thereby improving utilization of neurosynaptic resources.

In one embodiment, the SSM unit 640 maintains corresponding index information for each row 120 and for each column 110 of a matrix representation 100 of a neural network algorithm. For each row 120, the SSM unit 640 determines, based on corresponding index information for the row 120, the number of mapped blocks 150 in which the row 120 participates, wherein the number of splitters 160 the SSM unit 640 utilizes to implement multi-level splitting for the row 120 is based on the number of mapped blocks 150 in which the row 120 participates. Similarly, for each column 110, the SSM unit 640 determines, based on corresponding index information for the column 110, the number of mapped blocks 150 in which the column 110 participates, wherein the number of mergers 170 the SSM unit 640 utilizes to implement multi-level merging for the column 110 is based on the number of mapped blocks 150 in which the column 110 participates.

In one embodiment, the rows 120 and the columns 110 requiring splitters 160 and/or mergers 170 may generate outputs with a delay. If the implementation of a graph G representing a neural network algorithm necessitates synchronicity between mapped substrate neuron outputs, delay is added to mapped substrate neurons that either don't require splitting or merging, or that have fewer splits/merges than those with which synchronicity must be maintained.

Figure 7:
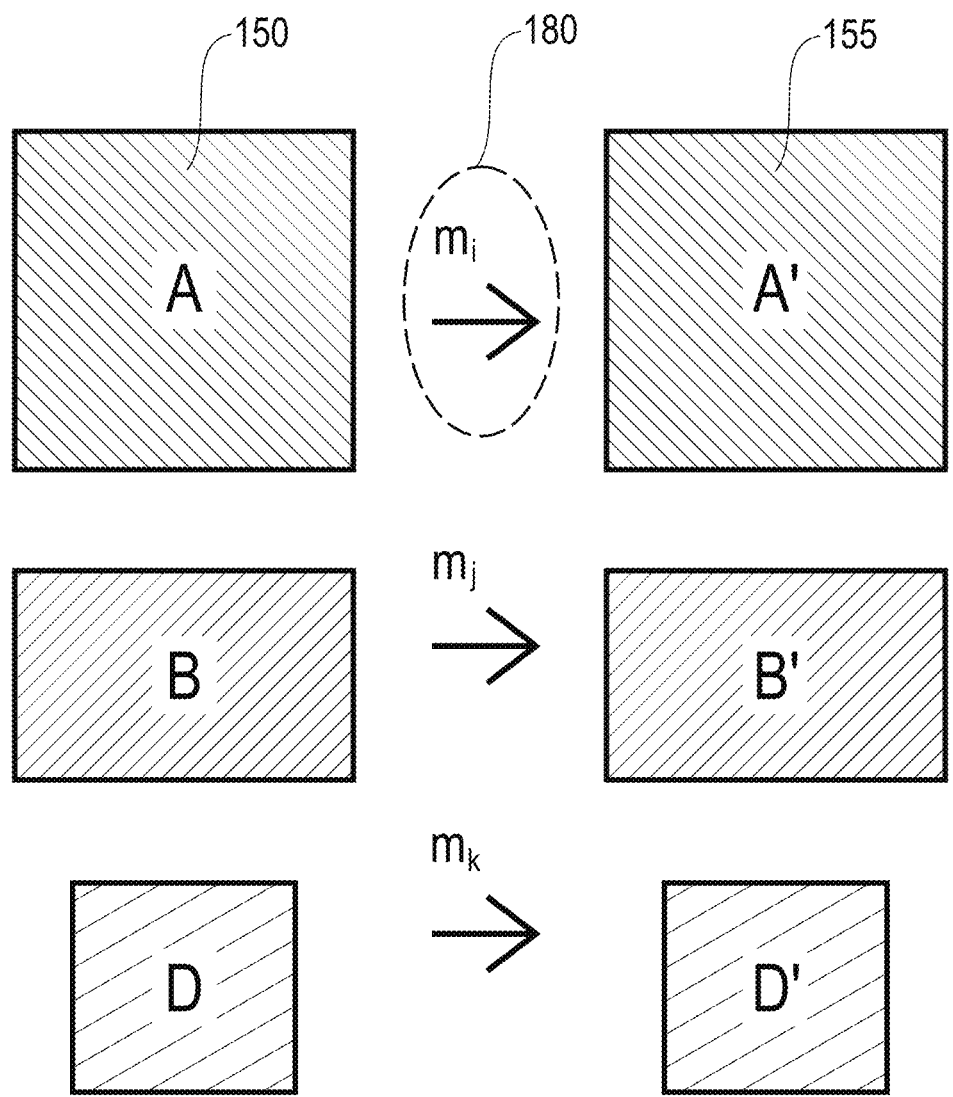
FIG. 7 illustrates an example mapping of extracted sub-matrices, in accordance with an embodiment of the invention.

FIG. 7 illustrates different example mapping methods, in accordance with an embodiment of the invention. As stated above, for each block 150 of a reordered matrix 130, the SSM unit 640 of the system 600 is configured for selecting and applying a method m best-suited for mapping the block 150 on a neurosynaptic substrate 520. The mapping unit 620 maps a block 150 on a neurosynaptic substrate 520 based on a method m selected by the SSM unit 640 for the block 150.

The system 600 is configured to apply different mapping method where results (e.g., in terms of efficiency and accuracy) may vary according to specific properties of a given graph G representing a neural network algorithm. The term mapping as used herein denotes a process of transforming all or parts of a graph G representing a neural network algorithm from an initial/unconstrained configuration into a constrained/substrate-compliant configuration. Furthermore, different mapping methods may be more or less appropriate for different areas of the graph G, wherein those areas likely to benefit from the same mapping method may not be adjacent or obviously associated within the graph G itself.

For example, as shown in FIG. 7, the system 600 may apply a first mapping method $m_i$ for a block A of the reordered matrix 130 in FIG. 5, a second mapping method $m_j$ for a block B of the reordered matrix 130 in FIG. 5, and a third mapping method $m_k$ for a block D of the reordered matrix 130 in FIG. 5. The blocks A', B' and D' further illustrated in FIG. 7 denote mapped or substrate-compliant configurations of blocks A, B and D, respectively.

Embodiments of the invention provide a means of managing beneficial grouping of inputs, selection, application and evaluation of multiple mapping methods to guarantee a reasonable, and possibly optimal, outcome of a neural network algorithmic mapping process. In one embodiment, the system 600 evaluates each available method m in a set of methods M against each metric contained in a set of characteristics C to obtain a vector v(m), wherein the length of the vector v(m) is equal to the number of evaluation metrics in the set of characteristics C. Each element of the vector v(m) denotes a score for a particular method m according to a metric.

For each block 150 of a reordered matrix 130 to be mapped, the system 600 specifies in a vector v(u) weights that are to be applied to each metric, wherein the length of the vector v(u) is equal to the number of evaluation metrics. The higher the importance of a particular metric to a block 150, the larger a corresponding weight specified in the vector v(u). The system 600 then selects a method m that maximizes the inner product <v(m), v(u)>.

The choice of vector v(u) for a particular block 150 may be predefined if the block 150 implements a known functionality, such as splitting, merging, etc. Elements of vector v(u) may be set to default values. The default values may be specified by a user of the method, learned via statistical techniques, or looked up on the basis of any graph-theoretic measure applied to the graph G. The choice of vector v(u) may also be influenced by neuron types constituting the block 150.

In one embodiment, elements of a vector v(u) for a block 150 of a reordered matrix 130 may be adjusted iteratively as follows: (1) select a vector v(u), (2) map the block 150 using a method m that maximizes the inner product <v(m),v(u)>, (3) evaluate a resulting substrate-mapped neural network for the block 150 against each metric, and (4) if an error corresponding to one or more evaluation metrics exceeds a predefined threshold, modify the vector v(u) and map the block 150 again; otherwise, mark the block 150 as mapped.

In one embodiment, based on user-input accuracy and resource utilization parameters, the system 600 is configured to identify and remap sub-matrices to trade off accuracy (in terms of weight and/or dynamic range) against resource utilization (in terms of neurons, axons, synapses, power, area, or other criteria listed below). For example, if a user-input error criterion was exceeded on a per-block basis, a corresponding element in vector u may be increased for any such blocks to bias mapping toward greater accuracy. As another example, if a user-input resource utilization criterion was exceeded on a block-by-block basis, a corresponding element in vector u could be increased for any such blocks to bias mapping toward lower resource utilization.

In one embodiment, reordering and/or algorithm-level iteration to reduce resource utilization may also be performed (e.g., by adjusting all vectors u, or by identifying specific blocks based on a sensitivity analysis or substitution strategy).

Figure 8:
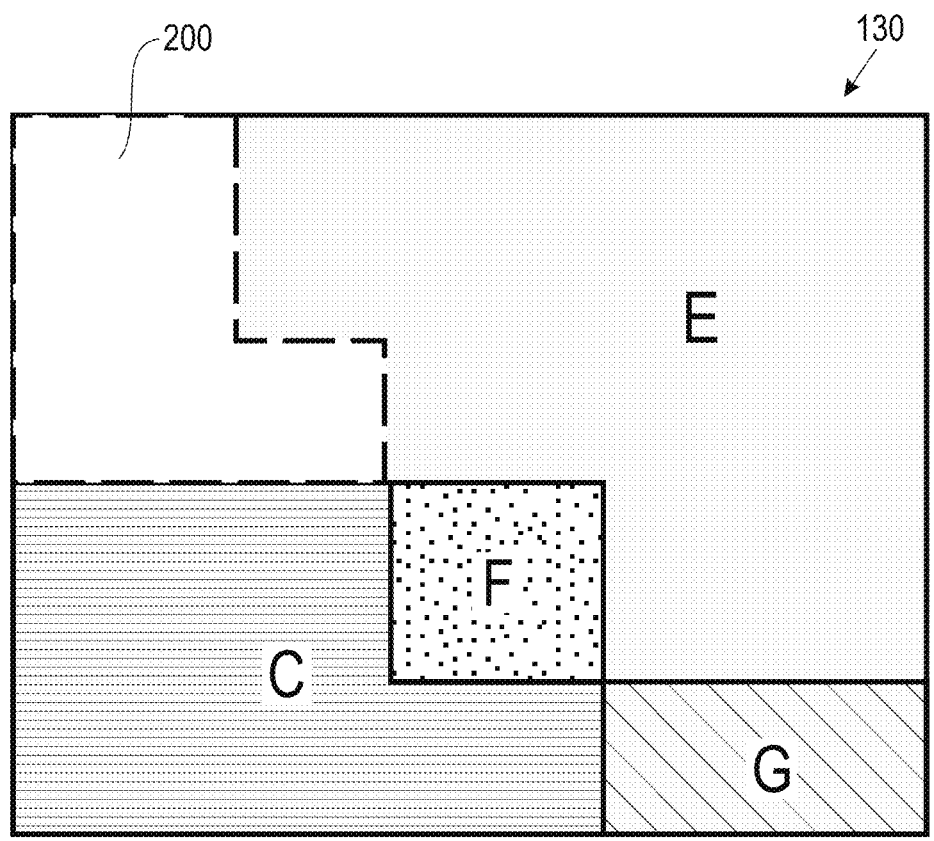
FIG. 8 illustrates marking of a block as mapped, in accordance with an embodiment of the invention.

FIG. 8 illustrates an example marking of a mapped block 150, in accordance with an embodiment of the invention. In one embodiment, to mark each block 150 of a reordered matrix 130 as mapped, the system 600 replaces each entry of the mapped block 150 with zeroes, resulting in area 200 of the reordered matrix 130 with zero entries. For example, when blocks A, B and D of the reordered matrix 130 in FIG. 5 are mapped, the system 600 replaces each entry of each mapped block A, B and D with zeroes, resulting in an area 200 with zero entries, as shown in FIG. 8.

Figure 9:
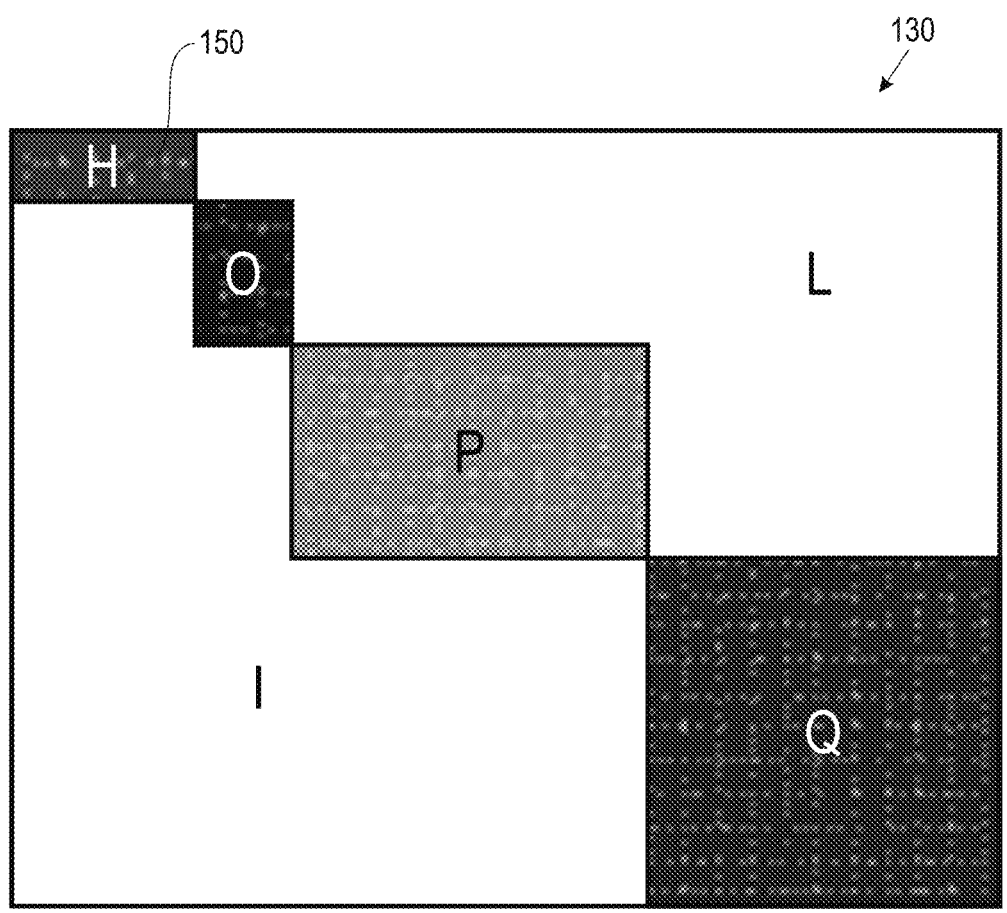
FIG. 9 illustrates another reordered graph following removal of mapped blocks, in accordance with an embodiment of the invention.

FIG. 9 illustrates another example reordered matrix 130, in accordance with an embodiment of the invention. The system 600 proceeds with mapping different areas of a graph G representing a neural network algorithm on a neurosynaptic substrate 520 in an iterative/recursive manner until all areas of the graph G have been mapped on the substrate 520. For example, after blocks A, B and D of the reordered matrix 130 in FIG. 5 are mapped and replaced with zero entries, the system 600 generates another reordered matrix 130 as shown in FIG. 9 with blocks of different densities, such as blocks H, I, L, O, P and Q.

Figure 10:
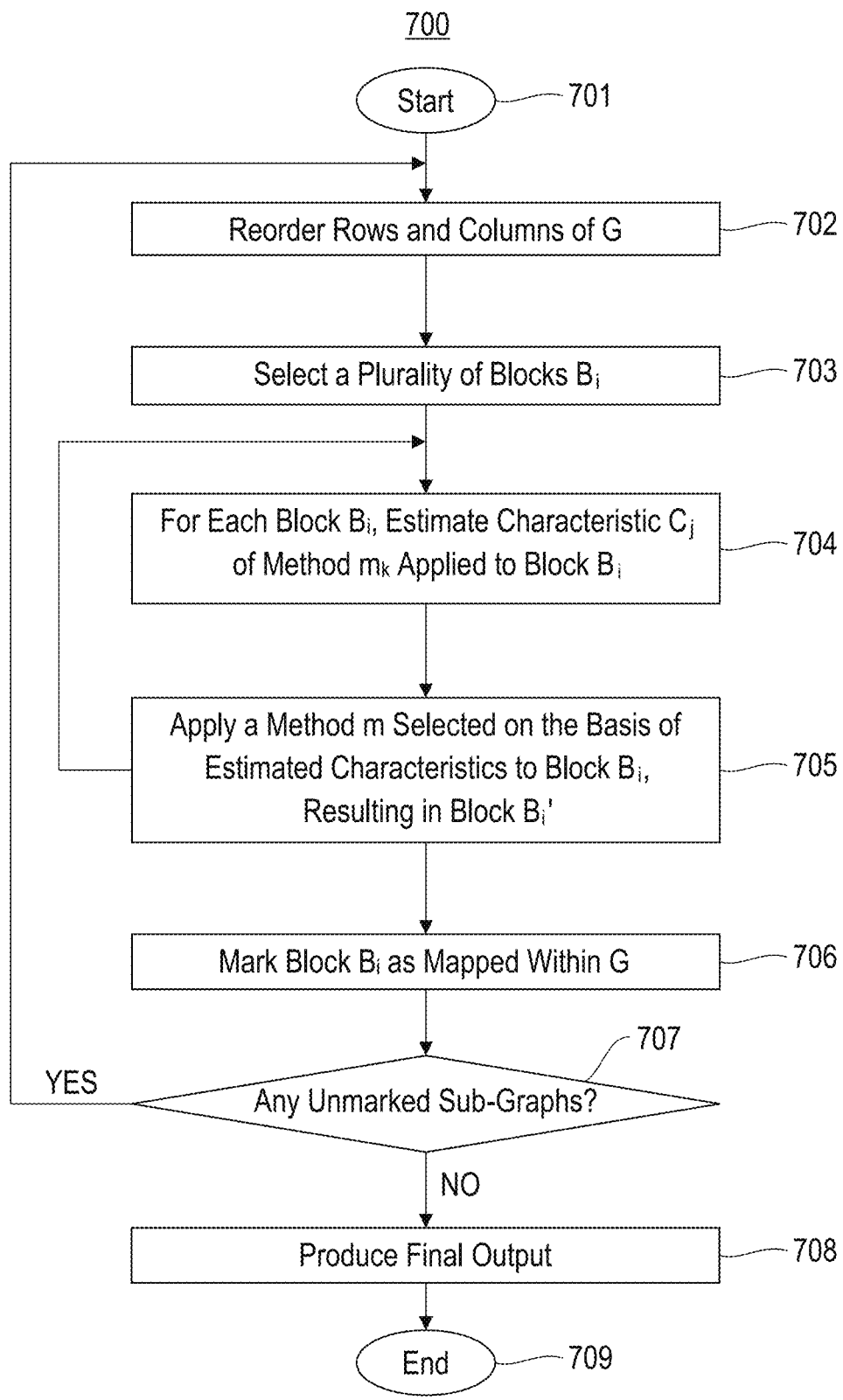
FIG. 10 illustrates a flowchart of an example process for implementing a neural network algorithm on a neurosynaptic substrate, in accordance with an embodiment of the invention.

FIG. 10 illustrates a flowchart of an example process 700 for mapping a neural network algorithm on a hardware neurosynaptic substrate, in accordance with an embodiment of the invention. In process block 701, the process starts. In process block 702, reorder rows and columns of a matrix representation of a graph G representing the neural network algorithm into multiple blocks. In process block 703, select a plurality of blocks $B_i$. In process block 704, for each block $B_i$, estimate characteristic $C_j$ of method $m_k$ applied to the block $B_i$. In process block 705, apply a method m selected on the basis of estimated characteristics to block $B_i$, resulting in mapped block $B_i'$. Process blocks 704 and 705 are repeated for each of the plurality of blocks Bi selected in process block 703. In process block 706, mark all blocks $B_i$ as mapped within the matrix representation of the graph G. In process block 707, determine whether there are any unmarked sub-graphs of the graph G.

If there are any un-marked sub-graphs, return to process block 702. If there are no un-marked sub-graphs, proceed to process block 708.

In process block 708, produce final output. In process block 709, the process ends.

Figure 11:
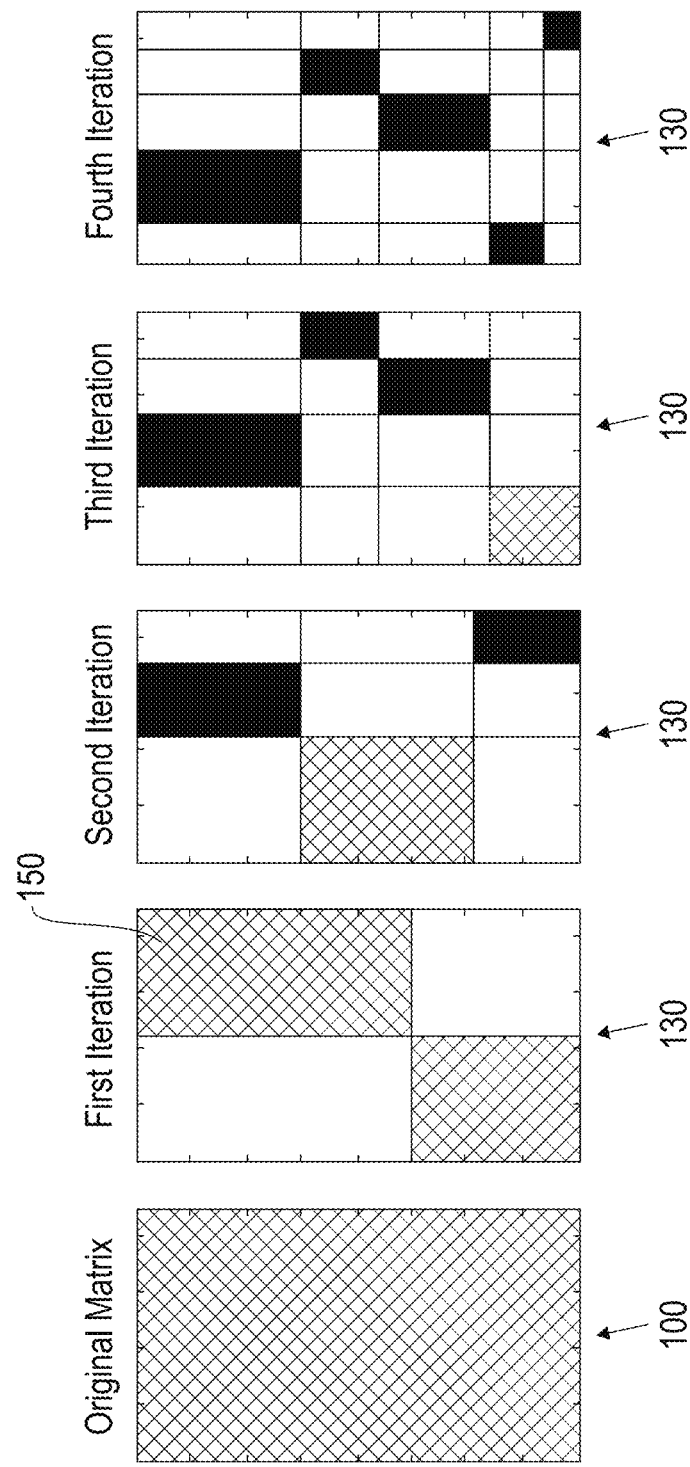
FIG. 11 illustrates an example clustering method for reordering an input graph, in accordance with an embodiment of the invention.

FIG. 11 illustrates an example reordering method for reordering a matrix representation 100 of a neural network algorithm, in accordance with an embodiment of the invention. An example reordering method may be a cross-association method, as described in a publication titled "Fully Automatic Cross-Associations" by Chakrabarti, D. et al., published in Association for Computing Machinery's Special Interest Group on Knowledge Discovery and Data Mining (ACM SIGKDD) International Conference on Knowledge Discovery and Data Mining, 2014. The cross-association method co-clusters dense areas and sparse areas of the matrix representation 100. The cross-association method does not require prior specification of the number or size of blocks 150.

As stated above, the system 600 maps different areas of the matrix representation 100 on a neurosynaptic substrate 520 in an iterative/recursive manner until all areas of the matrix representation 100 have been mapped on the substrate 520. As shown in FIG. 11, during each iteration, the cross-association method co-clusters remaining dense areas and sparse areas of the matrix representation 100 into a reordered matrix 130. In general, any reordering method may be applied iteratively or recursively after a partial mapping has been completed.

Figure 12:
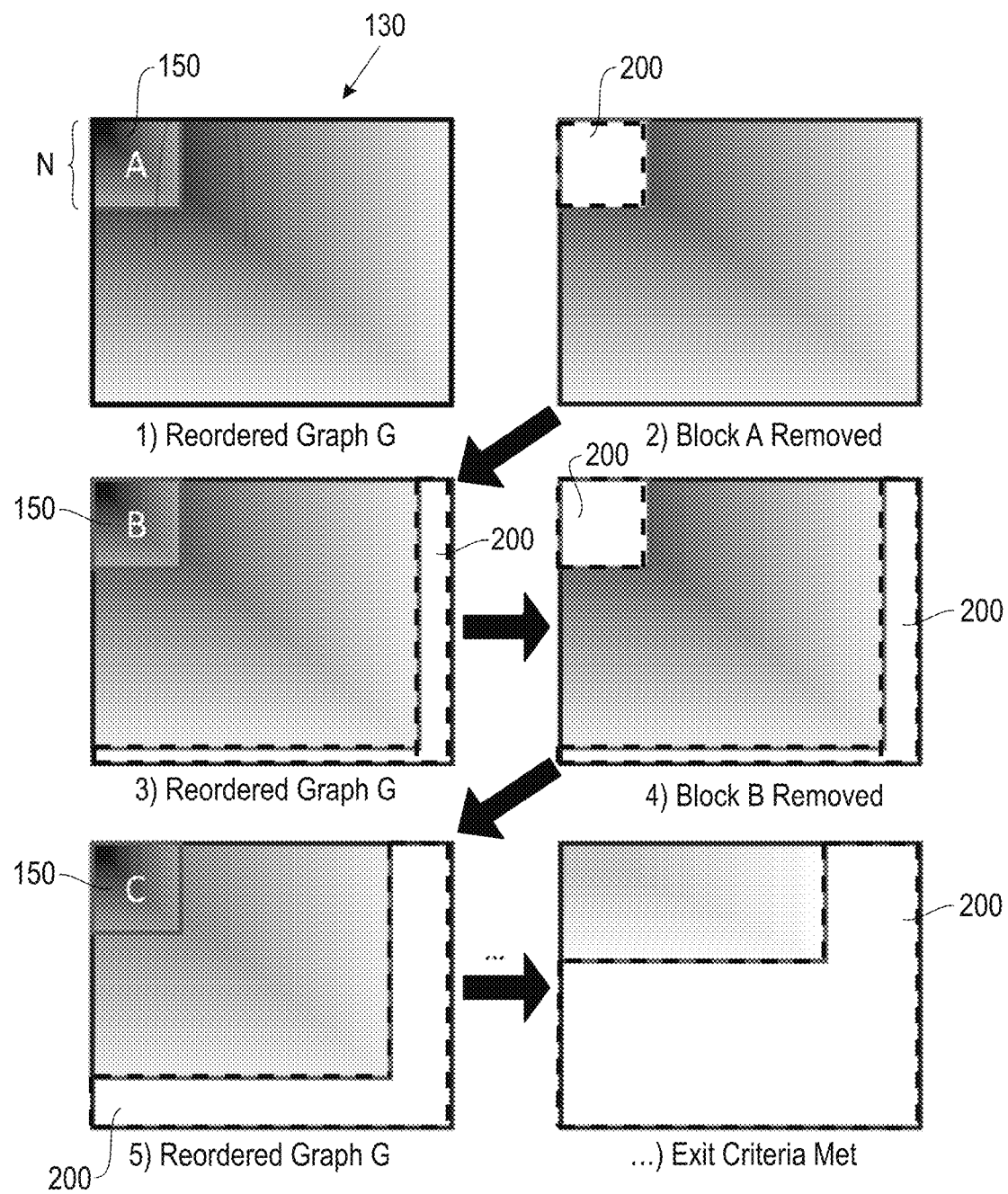
FIG. 12 illustrates an example weight-descent blocking algorithm for reordering an input graph, in accordance with an embodiment of the invention.

FIG. 12 illustrates another example reordering method for reordering a matrix representation 100 of a graph G representing a neural network algorithm, in accordance with an embodiment of the invention. In one example implementation, the system 600 reorders a matrix representation 100 of a graph G representing a neural network algorithm based on a weight-descent blocking method. The weight-descent blocking method allows for creation of blocks 150 of a specified size.

In one embodiment, the system 600 maps different areas of the matrix representation 100 on a neurosynaptic substrate 520 in an iterative/recursive manner until a pre-determined exit criteria. During each iteration, the weight-descent blocking method reorders remaining areas of the matrix representation 100 to create a high-weight block 150 of dimensions N×M. When the block 150 is mapped, entries within the block 150 are replaced with zeroes. The system 600 proceeds in this iterative manner until a pre-determined exit criteria is met. For example, as shown in FIG. 12, the system 600 creates a first high-weight block A during a first iteration, a second high-weight block B during a second iteration, and a third high-weight block C during a third iteration.

In one embodiment, the weight-descent blocking method creates a high-weight block 150 of dimensions N×M by selecting rows and columns for the block 150 that maximizes the sum of weights represented by entries of the block 150. In one example implementation, the weight-descent blocking method is implemented as follows: During each iteration, the system 600 sorts rows 120 by decreasing $S_i$ order, wherein $S_i$ is computed in accordance with equation (2) provided below:

$$S_i = \Sigma_{j=1,\ldots,M} W_{i,j} \qquad (2).$$

The system 600 also sorts columns by decreasing $T_j$ order, wherein $T_j$ is computed in accordance with equation (3) provided below:

$$T_j = \Sigma_{i=1,\ldots,N} W_{i,j} \qquad (3).$$

At the end of each iteration, the system 600 computes a value R denoting a sum of weights represented by entries of a high-weight block 150 in accordance with equation (4) provided below:

$$R = \Sigma_{j=1,\ldots,M} \Sigma_{i=1,\ldots,N} W_{i,j} \qquad (4),$$

wherein the exit criteria is met when R is less than a predefined threshold E. In one embodiment, the weights may be discretized.

In one embodiment, the predefined exit criteria may be one of the following: when the matrix representation 100 has only zero entries, when a predefined percentage of the matrix representation 100 has zero entries, when the largest element of the matrix representation 100 is smaller than a predefined threshold, when the sum of weights represented by entries of the matrix representation 100 is less than a predefined threshold, etc.

In one embodiment, for each high-weight block 150 of dimensions N×M created during each iteration, the weight-descent blocking method replaces at least min(M,N) non-zero entries of the block 150 with zeros. This guarantees that the mapping of the neural network algorithm on the neurosynaptic substrate 520 will terminate with an output of no more than K/min(N,M) blocks 150, wherein K denotes the number of non-zero entries in the matrix representation 100.

In another embodiment, the system 600 reorders a matrix representation 100 of a graph G representing a neural network algorithm based on other reordering methods/algorithms.

Figure 13:
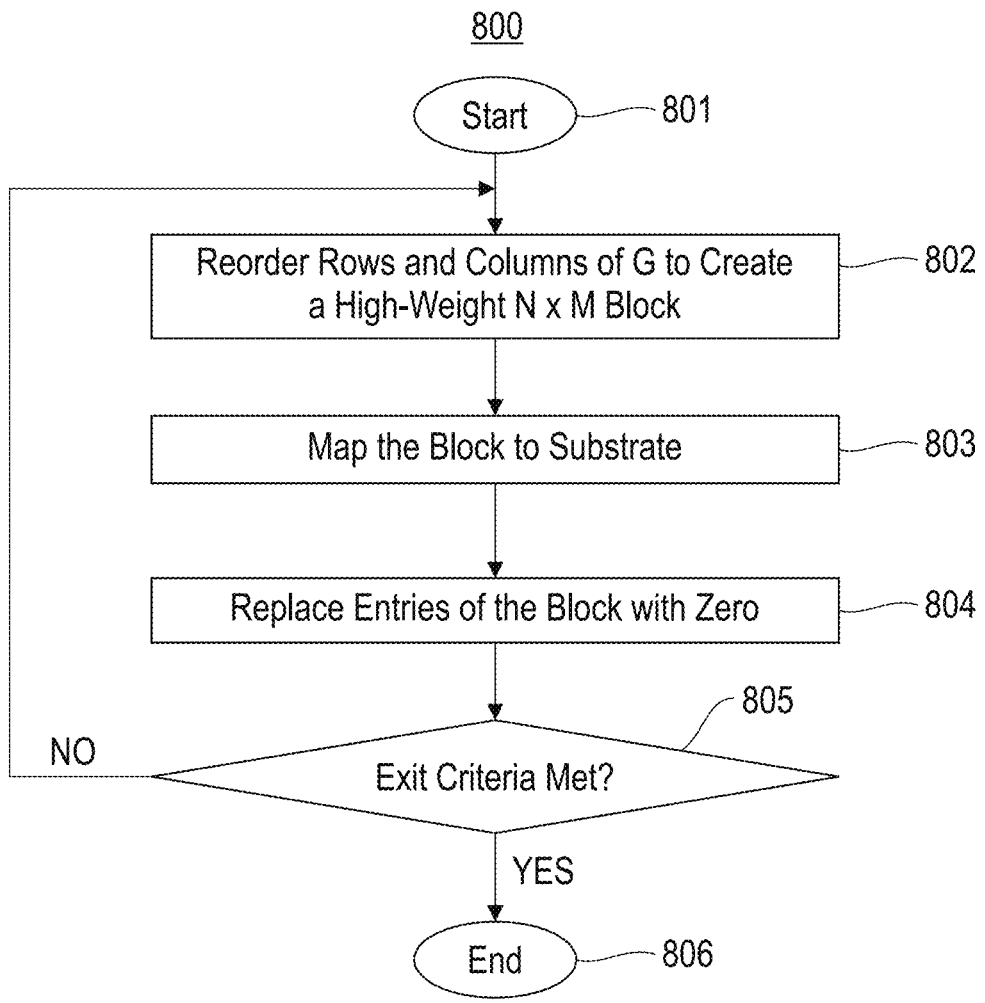
FIG. 13 illustrates a flowchart of an example process for reordering an input graph on the basis of a weight-descent blocking algorithm, in accordance with an embodiment of the invention.

FIG. 13 illustrates a flowchart of an example process 800 for reordering a matrix representation of a graph G representing a neural network algorithm based on a weight-descent blocking algorithm, in accordance with an embodiment of the invention. In process block 801, the process starts. In process block 802, reorder rows and columns of the matrix representation to create a high-weight N×M block. In process block 803, map the block to a hardware neurosynaptic substrate. In process block 804, replace one or more entries of the block with zeros. In process block 805, determine whether a predefined exit criteria has been met.

If the exit criteria is not met, return to process block 802. If the exit criteria is met, proceed to process block 806 where the process ends.

Figure 14:
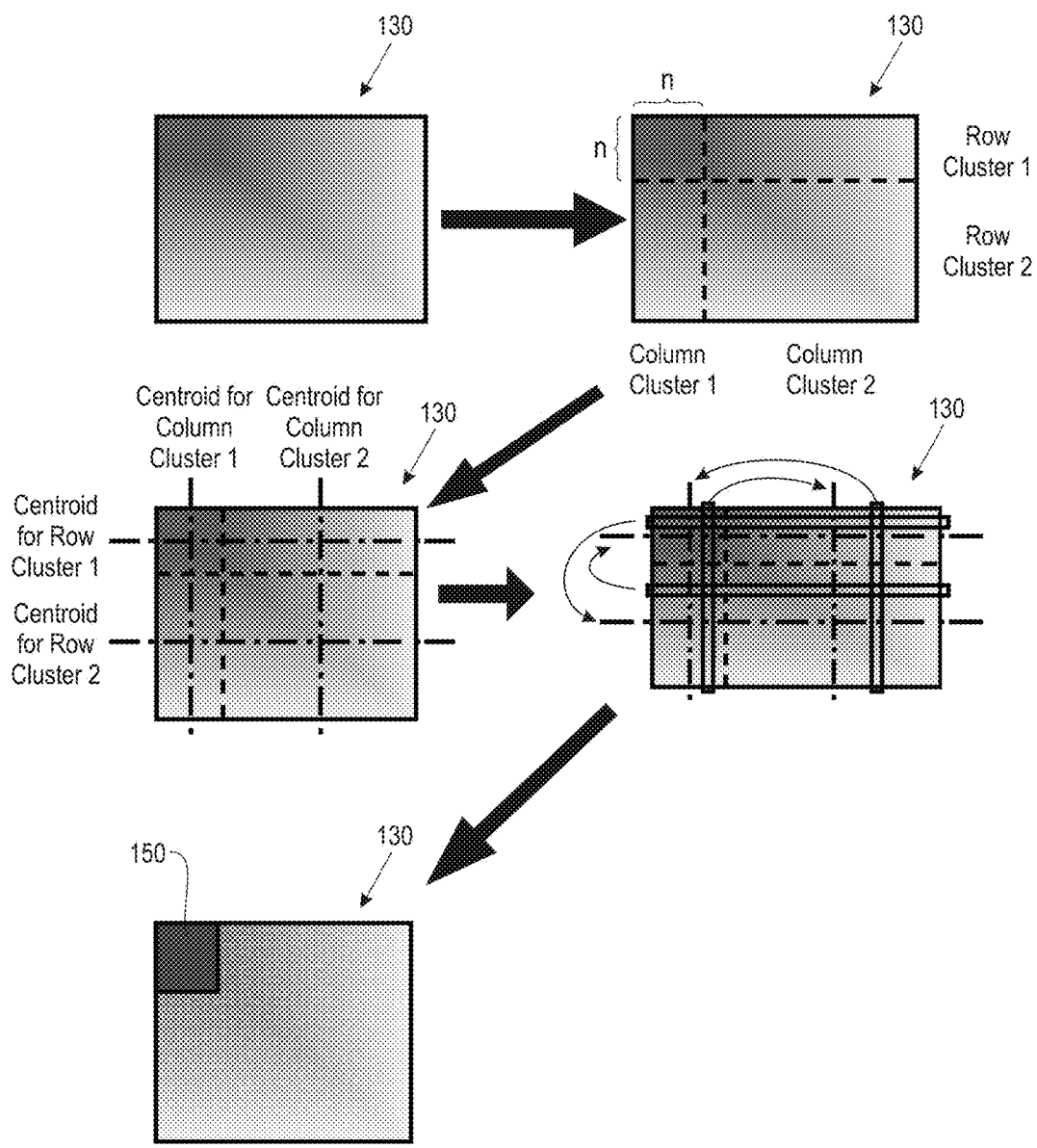
FIG. 14 illustrates reordering an input graph on the basis of pair-wise centroid distance minimization, in accordance with an embodiment of the invention.

FIG. 14 illustrates yet another example reordering method for reordering a matrix representation 100 of a graph G representing a neural network algorithm, in accordance with an embodiment of the invention. In one embodiment, the system 600 reorders a matrix representation 100 of a graph G representing a neural network algorithm based on a pair-wise centroid distance minimization method. The pair-wise centroid distance minimization method creates only one high-weight block 150 of dimensions n×m.

In one example implementation, the pair-wise centroid distance minimization method is implemented as follows: First, the system 600 reorders rows and columns of the matrix representation 100 in accordance with equations (2)-(4) as described above to produce a reordered matrix 130. Second, the system 600 divides the reordered matrix 130 into clusters/groups. Specifically, the system 600 divides rows of the reordered matrix 130 into two row clusters, such as a first row cluster (Row Cluster 1) of size n, and a second row cluster (Row Cluster 2) including the remaining rows. The system 600 also divides columns of the reordered matrix 130 into two column clusters, such as a first column cluster (Column Cluster 1) of size m, and a second column cluster (Column Cluster 2) including the remaining columns.

Third, the system 600 begins a loop comprising the following steps: (1) computing a cluster centroid for each row cluster and for each column cluster, (2) for each row, determining which cluster centroid is closest to the row; similarly, for each column, determining which cluster centroid is closest to the column, (3) creating a row-graph with as many nodes as there are row clusters, wherein there is an edge from a cluster centroid i to a cluster centroid j if there is a row in cluster i that prefers to be in cluster j (i.e., cluster centroid j is closest to the row); similarly, creating a column-graph with as many nodes as there are column clusters, wherein there is an edge from a cluster centroid i to a cluster centroid j if there is a column in cluster i that prefers to be in cluster j (i.e., cluster centroid j is closest to the column), and (4) removing all cycles in the row-graph by moving rows around such that there will only be 2 cycles in the row-graph because there are only two row clusters and two column clusters; similarly, removing all cycles in the column-graph by moving columns around such that there will only be 2 cycles in the column-graph because there are only two row clusters and two column clusters. The loop ends when a predefined exit criteria is met. The system 600 outputs another reordered matrix 130 from which a high-weight block 150 of dimensions n×m may be extracted.

In one embodiment, the predefined exit criteria is met when a maximum distance between any row/column in a cluster and a cluster centroid of another cluster is less than a predefined threshold or converges to a predefined lower limit value.

Figure 15:
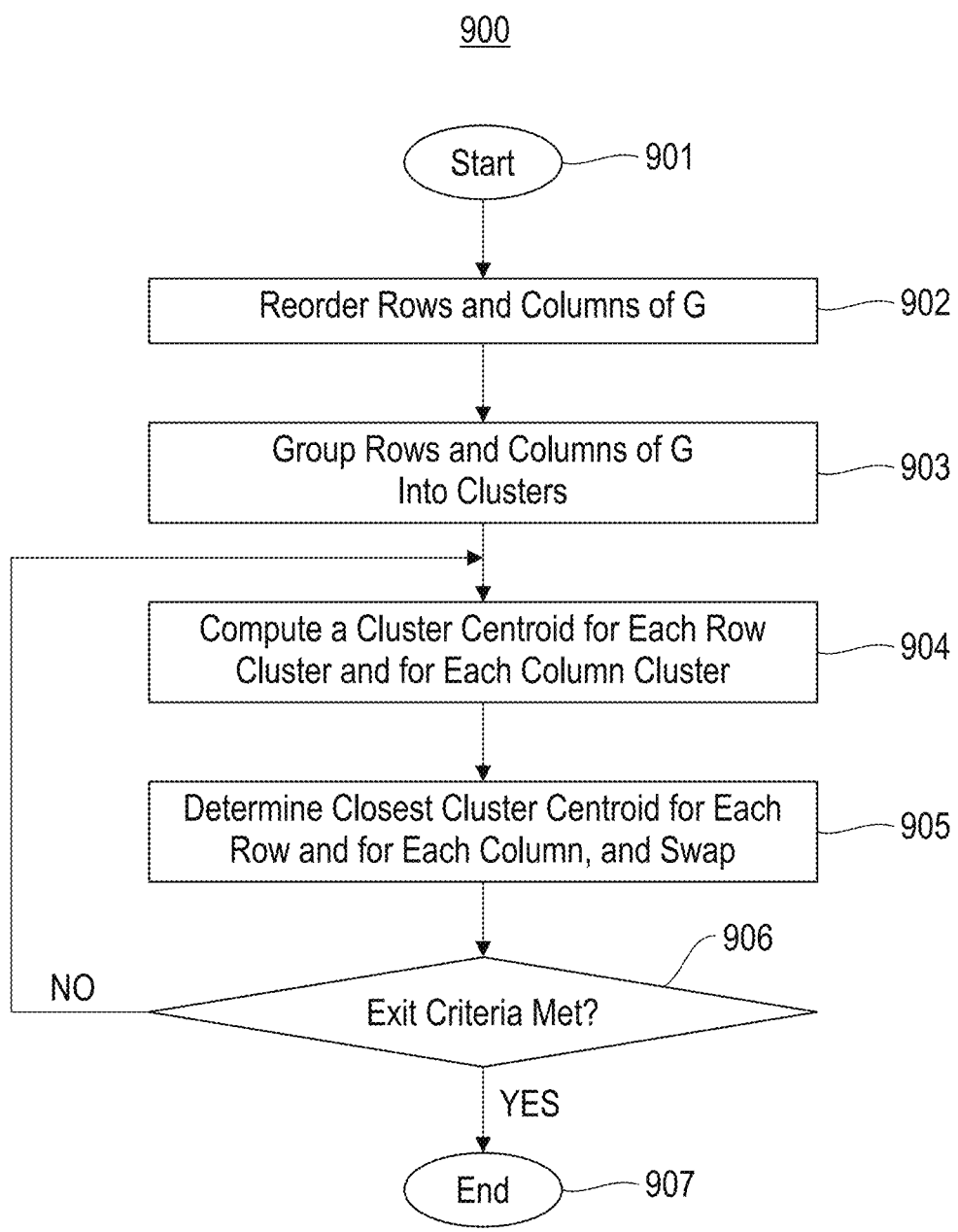
FIG. 15 illustrates a flowchart of an example process for reordering an input graph on the basis of a weight-descent blocking algorithm, in accordance with an embodiment of the invention.

FIG. 15 illustrates a flowchart of an example process 900 for reordering a matrix representation of a graph G representing a neural network algorithm based on a pair-wise centroid distance minimization algorithm, in accordance with an embodiment of the invention. In process block 901, the process 900 starts. In process block 902, reorder rows and columns of the matrix representation. In process block 903, groups rows and columns of the reordered matrix representation into clusters. In process block 904, compute a cluster centroid for each row cluster and for each column cluster. In process block 905, determined closest cluster centroid for each row and for each column, and swap. In process block 906, determine whether a predefined exit criteria has been met.

If the exit criteria is not met, return to process block 904. If the exit criteria is met, proceed to process block 907 where the process ends.

FIG. 16 illustrates an example table 400 for implementing multi-level splitting, in accordance with an embodiment of the invention. The table 400 includes corresponding index information for each row 120 of a matrix representation 100 of a graph G representing a neural network algorithm. For each row 120, the system 600 determines, based on corresponding index information for the row 120, the number of mapped blocks 150 in which the row 120 participates, wherein the number of splitters 160 the system 600 utilizes to implement multi-level splitting for the row 120 is based on the number of mapped blocks 150 in which the row 120 participates.

FIG. 17 illustrates an example table 450 for implementing multi-level merging, in accordance with an embodiment of the invention. The table 450 includes corresponding index information for each column 110 of a matrix representation 100 of a graph G representing a neural network algorithm. For each column 110, the system 600 determines, based on corresponding index information for the column 110, the number of mapped blocks 150 in which the column 110 participates, wherein the number of mergers 170 the system 600 utilizes to implement multi-level merging for the column 110 is based on the number of mapped blocks 150 in which the column 110 participates.

As stated above, the system 600 is configured to apply different mapping methods.

An example mapping method is split-permute-merge method. In one embodiment, the system 600 applies a split-permute-merge method when mapping a weighted bipartite graph G representing a neural network algorithm on a neurosynaptic substrate 520. Under the split-permute-merge method, the system 600 allocates one splitter 160 and one merger 170 for each edge of the graph G. Real valued weights may be implemented using the synaptic weight and threshold of the splitter neuron as well as the weight associated with the receiving merge axon. After applying splitters and mergers as needed to implement the fan-in and fan-out of the given bipartite graph, the permutation becomes a simple 1-1 mapping between a set S of spike sources and a set T of targets such that each source in S is connected to exactly one target in T.

The number of axon types available on a neurosynaptic substrate 520 may be constrained. In one embodiment, the system 600 applies an expectation-maximization algorithm when mapping a real-valued weight matrix representation 100 of a graph G representing a neural network algorithm on the neurosynaptic substrate 520.

Let A denote a real-valued weight matrix representation 100 of a graph G representing a neural network algorithm, wherein the matrix A has m rows and n columns. Let b denote an integer value. Let G(i) denote a bucket that an $i^{th}$ row of matrix A is clustered into. The system 600 clusters rows of matrix A into b buckets, such that an $i^{th}$ row is clustered into bucket G(i)={1, 2, ..., b}. For each column j, b weights $\{s_j^1, s_j^2, \ldots, s_j^b\}$ corresponding to each of the buckets are computed. Binary values w(ij) for each i and j are selected, such that for a distance measure $d(a,b)=(a-b)^2$, a sum $$\sum_{i=1}^{m} \sum_{j=1}^{n} d(A_{ij}, s_j^{G(i)} w_{ij})$$

is minimized.

In one embodiment of the invention, the system 600 provides enhancements and extensions for increasing overall utility and that are applicable to different situations and cases.

In one embodiment, the system 600 provides enhancements relating block size to dimensions of a synaptic crossbar of a neurosynaptic substrate. For a neurosynaptic substrate utilizing a synaptic crossbar, the system 600 may select a reordering method that adapts to a specified crossbar size of the synaptic crossbar. For example, the system 600 may select or configure a reordering method to produce blocks of a specified size that best matches the specified crossbar size. The system 600 may also aggregate smaller blocks and/or break larger blocks with splitters to make most efficient use of the specified crossbar size.

Figure 18:
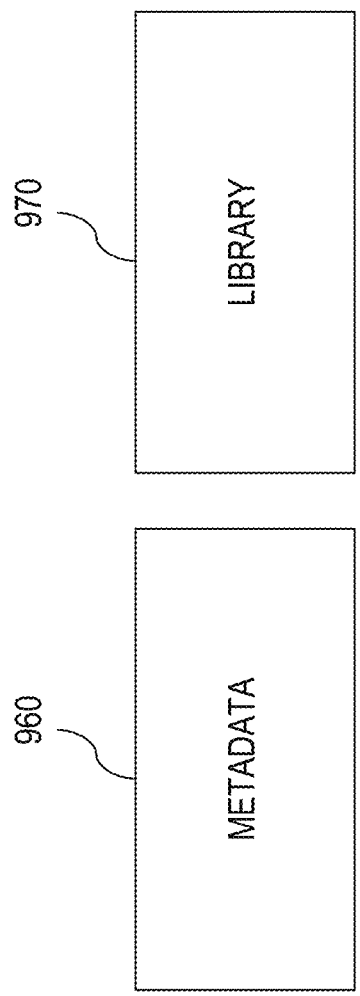
FIG. 18 illustrates an example framework for providing enhancements utilizing metadata, in accordance with an embodiment of the invention.

In one embodiment, the system 600 provides enhancements utilizing metadata. FIG. 18 illustrates an example framework 950 of the system 600 for providing enhancements utilizing metadata, in accordance with an embodiment of the invention. A neural network may be represented as a quintet G=(V, f, E, w, D), wherein V is the set of nodes, wherein f is a mapping of the nodes to neuron types, wherein E is the set of edges, wherein w is a mapping from the set of edges to real values, and wherein D is a set of metadata entries. Each metadata entry may identify a specific block/sub-matrix of an adjacency matrix representation of the neural network and a corresponding set of parameters. As described in detailed below, a set of parameters associated with a block/sub-matrix may include metadata information specifying a particular mapping method, metadata information identifying a type of circuit for which a library element may be looked up, metadata information constraining a reordering method not to reorder certain rows and columns within the block/sub-matrix, metadata information specifying weights for different evaluation metrics used in selecting a mapping method, or metadata information for managing synchronization, timing and any delays. The framework 950 comprises a metadata unit 960 for analyzing each metadata entry.

In one example implementation, the metadata unit 960 analyzes metadata entries comprising metadata information specifying a particular mapping method. A user (e.g., an algorithm designer) may specify one or more metadata entries designating a particular mapping method, or a class of methods, that the system 600 may utilize to yield the best results. The system 600 may also designate a specialized mapping method for splitters 160 and mergers 170 added during the iterative/recursive mapping process, thereby balancing allocation across one or more core circuits 10 for more efficient resource utilization.

In one example implementation, the metadata unit 960 analyzes metadata entries comprising metadata information specifying, at the outset, which rows and columns of an adjacency matrix representation should be mapped and/or that need not be re-ordered (i.e., shuffled). For example, a user may specify, at the outset, metadata entries/labels for a particular subset of rows and columns of the adjacency matrix representation that need not or should not be re-ordered. Based on the metadata entries/labels, the system 600 will not re-order the subset of rows and columns when mapping to a substrate 520 (i.e., the metadata entries/labels constrain a reordering method not to reorder the subset of rows and columns). This particular enhancement is applicable to where a specific order of rows and columns of an adjacency matrix representation must be preserved during the mapping process.

In one example implementation, the metadata unit 960 analyzes metadata entries comprising metadata information specifying weights for different evaluation metrics used by the system 600 in selecting a mapping method. A user (e.g., an algorithm designer) may specify metadata entries comprising one or more evaluation functions and constraints that are appropriate to a particular neural network algorithm. For example, if a particular neural network algorithm represents a convolution network, the user may specify that all filters must have the same weights. The system 600 may use the evaluation functions and constraints specified to drive the selection of mapping methods or influence the behavior of selected mapping methods.

In one example implementation, the metadata unit 960 analyzes metadata entries comprising metadata information specifying timing, synchronization or other temporal constraints. Inputs to the neural network may have different coding schemas of operation or specified temporal relationships between groups of neurons, inputs and/or outputs. One or more metadata entries comprising coding, temporal information and temporal constraints may be specified. The system 600 may add delays to mapped substrate neurons during the mapping process to satisfy such temporal constraints.

For example, if the neural network includes a designated set S of input neurons that must receive input signals at the same time, the input signals must have the same latency before they reach the mapped substrate neurons. If splitters are added during the mapping process, the latency may not be uniform after the mapping. To satisfy the requirement for uniform latency, the system 600 may compute latency on each input neuron in the set S, determine which input neuron has the largest latency, and add delays along input paths of the other input neurons in the set S to match the largest latency. The addition of delays thereby ensures that all input neurons in the input set S have the same latency.

As another example, the neural network may include two different groups of input neurons with a specified relative delay between the two groups. The system 600 may add delays to both groups to ensure uniform latency within each group and maintain the specified relative delay between the groups.

As yet another example, the metadata entries may specify a spike encoding schema that is time-dependent (e.g., a time-to-spike coding). The system 600 may add a delay or generate a trigger or reset signal at corresponding times to add during the mapping process to implement the spike encoding schema on a substrate. Depending on the architecture or type of neurosynaptic substrate in use, the addition of trigger or reset signals may require allocation of additional axons, neurons or synapses, and/or setting core or neuron parameters (e.g., setting appropriate synaptic weights to reset axons). For example, if a substrate requires axon lines for reset signals, the reset signals may be added to a corresponding adjacency matrix representation for the neural network in the form of one or more additional reset neurons before mapping. If an input neuron is mapped to multiple substrate neurons, a corresponding reset signal may be distributed to some or all of the substrate neurons.

In the event that a mapping cannot be augmented to satisfy one or more specified temporal constraints, the system 600 may alert the user as to which temporal constraints are not satisfied.

In one example implementation, the metadata unit 960 analyzes metadata entries comprising metadata information identifying a neural circuit for which a library element may be looked up. In one embodiment, the framework 950 further comprises a library 970 maintaining multiple library elements. Each library element comprises a reusable and composable neural circuit. A reusable and composable neural circuit may comprise either a single substrate-compliant neuron or a combination of multiple substrate-compliant neurons.

In one embodiment, the library 970 includes library elements representing different neuron functions, where each neuron function is implementable by a reusable and composable neural circuit with one or more configurable properties (e.g. threshold, weights, etc). For example, the library 970 may support a wide variety of computational functions (e.g., arithmetic, control, data generation, logic, memory, classic neuron behaviors, signal processing, and probabilistic computation) and neural codes (e.g., rate, population, binary, and time-to-spike). The system 600 may only accommodate mapping of neuron functions that have a representative implementation within the library 970. For one or more computational nodes in an adjacency matrix representation, the system 600 may select, from the library 970, one or more reusable and composable neural circuits with associated synaptic connectivity that replicate behavior/function of the computational node. The system 600 may index the library 970 based on metadata entries for the computational nodes. The metadata entries may comprise metadata information describing behavior/function of the computational nodes.

In one example, each reusable and composable neural circuit selected may be treated as a microcircuit and mapped directly to the neurosynaptic substrate. In another example, each reusable and composable neural circuit selected may be expanded, flattened and subjected to reordering before mapping to the neurosynaptic substrate. In yet another example, each reusable and composable neural circuit selected may be expanded, flattened and marked not to reorder in order to preserve adjacency before mapping to the neurosynaptic substrate.

In one embodiment, the library 970 includes library elements representing commonly used and recurring structures (e.g., network connectivity patterns) that may be implemented by efficient neurosynaptic program implementations. For example, the metadata unit 960 may analyze metadata entries to determine connectivity patterns, and search the library 970 for a representative implementation. For example, if a subset of nodes are tagged with metadata entries/labels indicating that the subset are part of a convolution network with connectivity patterns representing a Toeplitz pattern, the system 600 may index the library 970 and invoke a representative implementation to represent the subset.

Figure 19:
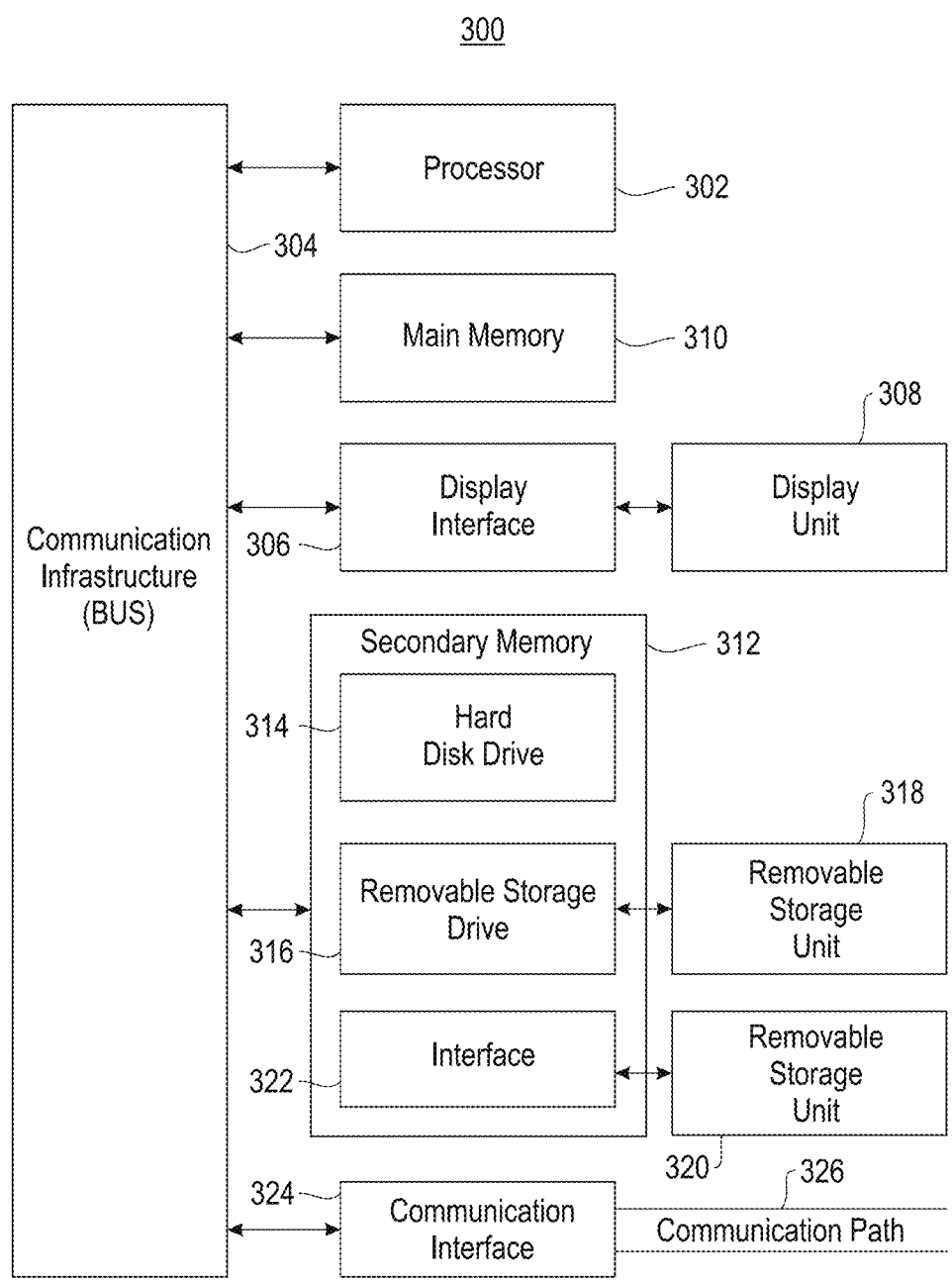
FIG. 19 is a high level block diagram showing an information processing system useful for implementing one embodiment of the present invention.

FIG. 19 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    at least one processor; and
    a non-transitory processor-readable memory device storing instructions that when executed by the at least one processor causes the at least one processor to perform operations including:
        reordering one or more dimensions of an adjacency matrix representation of a neural network based on one or more hardware constraints for one or more hardware elements of a neurosynaptic substrate to partition the adjacency matrix representation into multiple portions of a size satisfying the one or more hardware constraints, wherein the neural network comprises a set of neurons with an operating latency requirement that the set of neurons receive inputs at the same time;
        for each portion of the multiple portions of the adjacency matrix representation:
            selecting, from a plurality of mapping methods, a mapping method for mapping the portion onto the neurosynaptic substrate; and
            mapping the portion onto the neurosynaptic substrate utilizing the mapping method selected;
        implementing synchronization and uniform latency within the set of neurons to satisfy the operating latency requirement by adding one or more delays to one or more mapped portions representing the set of neurons;
        receiving user input comprising one or more user-defined evaluation metrics relating to at least one of accuracy and resource utilization of the neurosynaptic substrate;
        evaluating each mapped portion against the one or more user-defined evaluation metrics, wherein each mapped portion that fails to satisfy the one or more user-defined evaluation metrics is re-mapped, and the re-mapping is biased towards one of increased accuracy or decreased resource utilization of the neurosynaptic substrate based on the one or more user-defined evaluation metrics;
        composing all mapped portions including all added delays into an output file representing an executable neural network that satisfies the one or more hardware constraints; and
        programming the neurosynaptic substrate in accordance with the output file, wherein the programmed neurosynaptic substrate satisfies the operating latency requirement.

2. The system of claim 1, wherein the neurosynaptic substrate comprises one or more interconnected core circuits, and each core circuit comprises a plurality of electronic neurons, a plurality of electronic axons, and a plurality of synapses interconnecting the neurons to the axons.

3. The system of claim 2, wherein the one or more user-defined evaluation metrics include at least one hardware constraint related to the neurosynaptic substrate.

4. The system of claim 3, wherein a hardware constraint is related to one of the following: neuron characteristics of the neurosynaptic substrate, synaptic weights of the neurosynaptic substrate, neuronal fan-in of the neurosynaptic substrate, and neuronal fan-out of the neurosynaptic substrate.

5. The system of claim 1, wherein the one or more user-defined evaluation metrics include at least one user-specified error criterion relating to accuracy, and each user-specified error criterion may be used to identify and re-map one or more portions of the adjacency matrix representation that exceed a pre-determined error threshold.

6. The system of claim 5, wherein a user-specified error criterion is based on one of the following: synaptic weights of the neurosynaptic substrate, and dynamic range of the synaptic weights of the neurosynaptic substrate.

7. The system of claim 1, wherein the one or more user-defined evaluation metrics include at least one user-specified resource utilization criterion relating to resource utilization of the neurosynaptic substrate, and each user-specified resource utilization criterion may be used to identify and re-map one or more portions of the adjacency matrix representation that exceed a pre-determined resource utilization threshold.

8. The system of claim 7, wherein a user-specified resource utilization criterion is based on one of the following: neurons of the neurosynaptic substrate, axons of the neurosynaptic substrate, synaptic weights of the neurosynaptic substrate, power consumption of the neurosynaptic substrate, surface area of neurosynaptic substrate.

9. The system of claim 1, wherein the operations further comprise:
    marking each mapped portion as mapped.

10. The system of claim 9, wherein, within the adjacency matrix representation, each entry of each mapped portion is marked as mapped by replacing said entry with zero.

11. The system of claim 1, wherein implementing synchronization and uniform latency within the set of neurons to satisfy the operating latency requirement further comprises:
for each neuron of the set of neurons, determining a corresponding latency on the neuron based on a mapped portion representing the neuron;
determining which neuron of the set of neurons has the largest latency based on each corresponding latency determined; and
for each neuron of the set of neurons that does not have the largest latency, adjusting a corresponding latency on the neuron to match the largest latency by adding one or more delays to a mapped portion representing the neuron.

12. The system of claim 1, wherein the dimensions of the adjacency matrix representation are reordered to produce blocks of a pre-determined size that substantially match a specified crossbar size of a synaptic crossbar of the neurosynaptic substrate.

13. The system of claim 1, wherein the operations further comprise:
reordering the dimensions of the adjacency matrix representation based on a weight-descent blocking method.

14. The system of claim 1, wherein the operations further comprise:
reordering the dimensions of the adjacency matrix representation based on a pair-wise centroid distance minimization method.

15. A method comprising:
reordering one or more dimensions of an adjacency matrix representation of a neural network based on one or more hardware constraints for one or more hardware elements of a neurosynaptic substrate to partition the adjacency matrix representation into multiple portions of a size satisfying the one or more hardware constraints, wherein the neural network comprises a set of neurons with an operating latency requirement that the set of neurons receive inputs at the same time;
for each portion of the multiple portions of the adjacency matrix representation:
selecting, from a plurality of mapping methods, a mapping method for mapping the portion onto the neurosynaptic substrate; and
mapping portion onto the neurosynaptic substrate utilizing the mapping method selected;
implementing synchronization and uniform latency within the set of neurons to satisfy the operating latency requirement by adding one or more delays to one or more mapped portions representing the set of neurons;
receiving user input comprising one or more user-defined evaluation metrics relating to at least one of accuracy and resource utilization of the neurosynaptic substrate;
evaluating each mapped portion against the one or more user-defined evaluation metrics, wherein each mapped portion that fails to satisfy the one or more user-defined evaluation metrics is re-mapped, and the re-mapping is biased towards one of increased accuracy or decreased resource utilization of the neurosynaptic substrate based on the one or more user-defined evaluation metrics;
composing all mapped portions including all added delays into an output file representing an executable neural network that satisfies the one or more hardware constraints; and
programming the neurosynaptic substrate in accordance with the output file, wherein the programmed neurosynaptic substrate satisfies the operating latency requirement.

16. The method of claim 15, further comprising:
marking each mapped portion as mapped.

17. The method of claim 16, wherein, within the adjacency matrix representation, each entry of each mapped portion is marked as mapped by replacing said entry with zero.

18. The method of claim 15, wherein implementing synchronization and uniform latency within the set of neurons to satisfy the operating latency requirement further comprises:
for each neuron of the set of neurons, determining a corresponding latency on the neuron based on a mapped portion representing the neuron;
determining which neuron of the set of neurons has the largest latency based on each corresponding latency determined; and
for each neuron of the set of neurons that does not have the largest latency, adjusting a corresponding latency on the neuron to match the largest latency by adding one or more delays to a mapped portion representing the neuron.

19. The method of claim 15, further comprising:
reordering the dimensions of the adjacency matrix representation based on a weight-descent blocking method.

20. The method of claim 15, further comprising:
reordering the dimensions of the adjacency matrix representation based on a pair-wise centroid distance minimization method.

* * * * *